United States Patent
Hambardzumyan et al.

(10) Patent No.: US 11,886,435 B1
(45) Date of Patent: Jan. 30, 2024

(54) SYSTEMS AND METHODS FOR EXECUTING QUERIES ON TENSOR DATASETS

(71) Applicant: Snark AI, Inc., San Francisco, CA (US)

(72) Inventors: Sasun Hambardzumyan, Yerevan (AM); Ivo Stranic, Brooklyn, NY (US); Tatevik Hakobyan, Burlington, MA (US); Davit Buniatyan, Mountain View, CA (US)

(73) Assignee: Snark AI, Inc., San Francisco, CA (US)

( * ) Notice: Subject to any disclaimer, the term of this patent is extended or adjusted under 35 U.S.C. 154(b) by 0 days.

(21) Appl. No.: 18/210,004

(22) Filed: Jun. 14, 2023

Related U.S. Application Data

(60) Provisional application No. 63/437,546, filed on Jan. 6, 2023.

(51) Int. Cl.
  *G06F 16/00* (2019.01)
  *G06F 16/2455* (2019.01)
  *G06F 16/2453* (2019.01)
  *G06F 16/248* (2019.01)

(52) U.S. Cl.
  CPC ...... *G06F 16/24553* (2019.01); *G06F 16/248* (2019.01); *G06F 16/24542* (2019.01)

(58) Field of Classification Search
  CPC ......... G06F 16/24553; G06F 16/24542; G06F 16/248
  USPC .................................................. 707/600–899
  See application file for complete search history.

(56) References Cited

U.S. PATENT DOCUMENTS

| | | | |
|---|---|---|---|
| 6,519,604 B1* | 2/2003 | Acharya | G06F 16/2462 707/738 |
| 2003/0204499 A1* | 10/2003 | Shahabi | G06F 16/24556 |
| 2005/0177553 A1* | 8/2005 | Berger | G06F 16/2264 |
| 2011/0055379 A1* | 3/2011 | Lin | G06F 18/2323 703/2 |
| 2017/0116292 A1* | 4/2017 | Boehme | G06F 16/24537 |
| 2017/0316007 A1* | 11/2017 | Vandenberg | G06F 16/24534 |
| 2022/0121880 A1 | 4/2022 | Buniatyan | |

(Continued)

OTHER PUBLICATIONS

Activeloop, "The Future of Deep Learning with Deep Lake" CIDR 2023, 17 pages.

(Continued)

*Primary Examiner* — Michelle N Owyang
(74) *Attorney, Agent, or Firm* — Foley & Lardner LLP

(57) ABSTRACT

Systems and methods for executing queries on tensor datasets are disclosed. A system can identify a query for a multi-dimensional sample dataset. Each sample of the multi-dimensional sample dataset can include one or more tensors. Each tensor of the one or more tensors can be associated with a respective identifier that is common to each sample of the multi-dimensional sample dataset. The query specifying a first identifier of a first tensor of the multi-dimensional sample dataset and a first range of a first dimension of the first tensor, or one or more operations such as sampling, grouping, ungrouping, or transformation operations, to perform on the first tensor of the multi-dimensional sample dataset. The system can parse the query, and execute the query to generate query results. The system can provide the query results as output.

20 Claims, 16 Drawing Sheets

(56) References Cited

U.S. PATENT DOCUMENTS

| | | | |
|---|---|---|---|
| 2022/0207032 A1* | 6/2022 | Budalakoti | G06F 16/2453 |
| 2022/0284017 A1* | 9/2022 | Johnson | G06F 16/2471 |
| 2022/0300511 A1* | 9/2022 | Adams | G06F 16/248 |

OTHER PUBLICATIONS

Hambardzumyan, et al. 2023. "Deep Lake: a Lakehouse for Deep Learning." CIDR 2023, Jan. 8-11, 2023, Amsterdam, The Netherlands, 12 pages.

* cited by examiner

| Index | Image | Label | Bbox | Label | User ID | Timestamp |
|---|---|---|---|---|---|---|
| 0 | Chunk 1 | Chunk 4 | Chunk 5 | Chunk 7 | Chunk 8 | Chunk 9 |
| 1 | | | | | | |
| 2 | Chunk 2 | | | | | |
| 3 | | | Chunk 6 | | | |
| 4 | Chunk 3 | | | | | |
| 5 | | | | | | |

FIG. 2

SYSTEMS AND METHODS FOR EXECUTING QUERIES ON TENSOR DATASETS

BACKGROUND

Machine-learning datasets can be both large and varied, including large amounts of information in several different formats. The large size, complexity, and format of the dataset can create technical difficulties in managing and communicating the dataset between systems, storing the dataset, processing the dataset, and utilizing the dataset in machine-learning processes.

SUMMARY

Conventional machine-learning repositories, such as traditional relational databases, provide data infrastructure for analytical workloads by enabling time travel, executing conventional structured query language (SQL) queries, ingesting data with atomicity, consistency, isolation, and durability (ACID) transactions, and accessing petabyte-scale datasets on cloud storage. However, as deep learning usage increases, traditional data lakes, such as relational databases, are not well designed for applications such as natural language processing (NLP), audio processing, computer vision, and applications involving non-tabular datasets. This results in poor computational performance, and may result in the aforementioned machine-learning operations becoming impracticable for large scale, tensor-based data.

The systems and methods described herein provide techniques that can store large-scale machine-learning data, including complex data, such as images, videos, annotations, as well as tabular data, in the form of tensors. These tensors can be stored as chunks and can be rapidly streamed over a network. Accessing and utilizing the complex machine-learning data is improved through the use of a (a) Tensor Query Language (TQL), as described herein, which can be utilized to access, filter, process, and stream machine-learning data efficiently for a variety of applications. The techniques described herein enable the use of large scale, complex data with deep learning frameworks without sacrificing computational utilization or network resources. Datasets stored according to the present techniques can be accessed using any suitable machine-learning library or application programming interface (API), such as PyTorch, TensorFlow, Just After eXecution (JAX), and may be integrated with any suitable machine-learning operations toolset.

One aspect of the present disclosure is directed to a method. The method includes identifying a query for a multi-dimensional sample dataset, each sample of the multi-dimensional sample dataset comprising one or more tensors. Each tensor of the one or more tensors has a respective identifier that is common to each sample of the multi-dimensional sample dataset. The query specifies a first identifier of a first tensor of the multi-dimensional sample dataset and a first range of a first dimension of the first tensor. The method includes parsing the query to extract the first identifier and the first range of the first dimension, and executing the query based on the first identifier to generate a set of query results comprising a set of indices identifying data corresponding to the first range of the first tensor of each sample of a subset of samples of the multi-dimensional sample dataset identified based on the query. The method includes providing the set of query results as output.

In some implementations, the query further specifies a requested shape for the data identified by the set of indices of the set of query results. In some implementations, the query further specifies a condition for a value of the first tensor or a second tensor, and the subset of samples are identified as satisfying the condition for the value of the first tensor or the second tensor. In some implementations, the query further specifies a mathematical operation, and the data identified by the set of indices is generated based on the mathematical operation.

In some implementations, executing the query includes generating one or more functors based on the first range of the query, a condition specified in the query, or a requested shape specified in the query. In some implementations, the method includes generating a computational graph based on the one or more functors. In some implementations, the query comprises at least one SQL keyword.

In some implementations, the query specifies a shuffle operation, and the set of indices is randomly ordered based on the shuffle operation. In some implementations, the first tensor comprises a plurality of dimensions including the first dimension. In some implementations, the one or more tensors of each sample of the multi-dimensional sample dataset are stored in one or more binary chunks, and the respective identifier of each tensor of the one or more tensors corresponds to a column in the respective dataset.

One other aspect of the present disclosure is directed to a system. The system includes one or more processors coupled to memory. The system can identify a query for a multi-dimensional sample dataset, each sample of the multi-dimensional sample dataset comprising one or more tensors. Each tensor of the one or more tensors can have a respective identifier that is common to each sample of the multi-dimensional sample dataset. The query specifies a first identifier of a first tensor of the multi-dimensional sample dataset and a first range of a first dimension of the first tensor. The system can parse the query to extract the first identifier and the first range of the first dimension, and execute the query based on the first identifier to generate a set of query results comprising a set of indices identifying data corresponding to the first range of the first tensor of each sample of a subset of samples of the multi-dimensional sample dataset identified based on the query. The system can provide the set of query results as output.

In some implementations, the query further specifies a requested shape for the data identified by the set of indices of the set of query results. In some implementations, the query further specifies a condition for a value of the first tensor or a second tensor, and the subset of samples are identified as satisfying the condition for the value of the first tensor or the second tensor. In some implementations, the query further specifies a mathematical operation, and the data identified by the set of indices is generated based on the mathematical operation.

In some implementations, the system can execute the query by performing operations comprising generating one or more functors based on the first range of the query, a condition specified in the query, or a requested shape specified in the query. In some implementations, the system can generate a computational graph based on the one or more functors. In some implementations, the query comprises at least one SQL keyword.

In some implementations, the query specifies a shuffle operation, and the set of indices is randomly ordered based on the shuffle operation. In some implementations, the first tensor comprises a plurality of dimensions including the first dimension. In some implementations, the one or more tensors of each sample of the multi-dimensional sample dataset are stored in one or more binary chunks, and the respective identifier of each tensor of the one or more tensors corresponds to a column in the respective dataset.

Another aspect of the present disclosure is directed to another method. The method includes identifying a query for a multi-dimensional sample dataset. The query specifies a group operation for a first range of a first tensor of the multi-dimensional sample dataset. Each sample of the multi-dimensional sample dataset includes one or more tensors. Each tensor of the one or more tensors has a respective identifier that is common to each sample of the multi-dimensional sample dataset. A first subset of samples of the multi-dimensional sample dataset includes the first range of the first tensor having a first value, and a second subset of samples of the multi-dimensional sample dataset includes the first range of the first tensor having a second value. The method includes parsing the query to extract the group operation for the first range of the first tensor. The method includes executing the query based on the group operation for the first range of the first tensor to generate a set of query results comprising a first identifier of a first group of indices identifying the first subset of samples and a second identifier of a second group of indices identifying the second subset of samples. Each sample in the first subset of samples is selected based on the first value being different from the second value. The method includes providing the set of query results as output.

In some implementations, the method includes identifying, by the one or more processors, a second query over the multi-dimensional sample dataset. The second query may specify an ungroup operation for the first tensor of the first group. In some implementations, the method includes parsing the second query to extract the ungroup operation for the first tensor. In some implementations, the method includes executing the query based on the ungroup operation for the first tensor of the first group to generate a second set of query results. The second set of query results may include a set of indices identifying each sample of the first subset of samples of the first group. In some implementations, the method includes providing, by the one or more processors, as output, the second set of query results.

In some implementations, the method includes identifying a second query over the multi-dimensional sample dataset. The second query may specify a sampling operation for the multi-dimensional sample dataset and identifying a first weight for the first value. In some implementations, the method includes parsing the second query to extract the sampling operation and the first weight. In some implementations, the method includes executing the second query based on the sampling operation to generate a second set of query results. The second set of query results can include a first number of indices from the first subset, the first number determined based on the first weight. In some implementations, the method includes providing, as output, the second set of query results.

In some implementations, the query further specifies a mathematical operation for a value of the first tensor, and the set of query results further comprises a respective set of references to portions of a result dataset generated based on the mathematical operation. In some implementations, executing the query comprises generating one or more functors based on the group operation specified in the query, a condition specified in the query, or a requested shape specified in the query. In some implementations, the method includes generating, by the one or more processors, a computational graph based on the one or more functors.

In some implementations, the query comprises at least one SQL keyword. In some implementations, the query specifies a shuffle operation, and the first subset or the second subset is randomly ordered based on the shuffle operation. In some implementations, the first tensor comprises a plurality of dimensions. In some implementations, the one or more tensors of each sample of the multi-dimensional sample dataset are stored in one or more binary chunks, and the respective identifier of each tensor of the one or more tensors corresponds to a column in the respective dataset.

Yet another aspect of the present disclosure is directed to a system. The system includes one or more processors coupled to a non-transitory memory. The system can identify a query for a multi-dimensional sample dataset. The query specifies a group operation for a first range of a first tensor of the multi-dimensional sample dataset. Each sample of the multi-dimensional sample dataset includes one or more tensors. Each tensor of the one or more tensors has a respective identifier that is common to each sample of the multi-dimensional sample dataset. A first subset of samples of the multi-dimensional sample dataset includes the first range of the first tensor having a first value, and a second subset of samples of the multi-dimensional sample dataset includes the first range of the first tensor having a second value. The system can parse the query to extract the group operation for the first range of the first tensor, and execute the query based on the group operation for the first range of the first tensor to generate a set of query results comprising a first identifier of a first group of indices identifying the first subset of samples and a second identifier of a second group of indices identifying the second subset of samples. Each sample in the first subset of samples is selected based on the first value being different from the second value. The system can provide the set of query results as output.

In some implementations, the system can identify a second query over the multi-dimensional sample dataset, the second query specifying an ungroup operation for the first tensor of the first group. In some implementations, the system can parse the second query to extract the ungroup operation for the first tensor. In some implementations, the system can execute the query based on the ungroup operation for the first tensor of the first group to generate a second set of query results. The second set of query results may include a set of indices identifying each sample of the first subset of samples of the first group. In some implementations, the system can provide, as output, the second set of query results.

In some implementations, the system can identify a second query over the multi-dimensional sample dataset, the second query specifying a sampling operation for the multi-dimensional sample dataset and identifying a first weight for the first value. In some implementations, the system can parse the second query to extract the sampling operation and the first weight. In some implementations, the system can execute the second query based on the sampling operation to generate a second set of query results. The second set of query results may include a first number of indices from the first subset. The first number may be determined based on the first weight. In some implementations, the system can provide, as output, the second set of query results.

In some implementations, the query further specifies a mathematical operation for a value of the first tensor, and In some implementations, the set of query results further comprises a respective set of references to portions of a result dataset generated based on the mathematical operation. In some implementations, the system can execute the query by performing operations comprising generating one or more functors based on the group operation specified in the query, a condition specified in the query, or a requested shape specified in the query. In some implementations, system can generate a computational graph based on the one or more functors.

In some implementations, the query comprises at least one SQL keyword. In some implementations, the query specifies a shuffle operation, and the first subset or the second subset is randomly ordered based on the shuffle operation. In some implementations, the first tensor comprises a plurality of dimensions. In some implementations, the one or more tensors of each sample of the multi-dimensional sample dataset are stored in one or more binary chunks, and the respective identifier of each tensor of the one or more tensors corresponds to a column in the respective dataset.

Another aspect of the present disclosure is directed to yet another method. The method includes identifying a query for a sample dataset, the query specifying an ungroup operation for a first group corresponding to a first tensor of the multi-dimensional sample dataset. Each sample of the multi-dimensional sample dataset includes one or more tensors. Each tensor of the one or more tensors has a respective identifier that is common to each sample of the multi-dimensional sample dataset. The method includes parsing, by the one or more processors, the query to extract the ungroup operation for the first group. The method includes executing the query based on the ungroup operation for the first tensor of the first group to generate a set of query results comprising a set of indices identifying each sample of the first group. The method includes providing the set of query results as output.

In some implementations, the query further specifies a mathematical operation for a value of the first tensor, and the set of query results further comprises a respective set of references to portions of a result dataset generated based on the mathematical operation. In some implementations, executing the query comprises generating one or more functors based on the ungroup operation specified in the query, a condition specified in the query, or a requested shape specified in the query. In some implementations, the method includes generating a computational graph based on the one or more functors.

In some implementations, the query comprises at least one SQL keyword. In some implementations, the query specifies a shuffle operation, and the set of query results is randomly ordered based on the shuffle operation. In some implementations, the first tensor comprises a plurality of dimensions. In some implementations, the one or more tensors of each sample of the multi-dimensional sample dataset are stored in one or more binary chunks, and the respective identifier of each tensor of the one or more tensors corresponds to a column in the respective dataset.

At least one other aspect of the present disclosure is directed to a system. The system can include one or more processors coupled to memory. The system can identify a query for a sample dataset, the query specifying an ungroup operation for a first group corresponding to a first tensor of the multi-dimensional sample dataset. Each sample of the multi-dimensional sample dataset includes one or more tensors. Each tensor of the one or more tensors has a respective identifier that is common to each sample of the multi-dimensional sample dataset. The system can parse the query to extract the ungroup operation for the first group. The system can execute the query based on the ungroup operation for the first tensor of the first group to generate a set of query results comprising a set of indices identifying each sample of the first group. The system can provide the set of query results as output.

In some implementations, the query further specifies a mathematical operation for a value of the first tensor, and the set of query results further comprises a respective set of references to portions of a result dataset generated based on the mathematical operation. In some implementations, the system can execute the query by performing operations comprising generating one or more functors based on the ungroup operation specified in the query, a condition specified in the query, or a requested shape specified in the query. In some implementations, system can generate a computational graph based on the one or more functors.

In some implementations, the query comprises at least one SQL keyword. In some implementations, the query specifies a shuffle operation, and the set of query results is randomly ordered based on the shuffle operation. In some implementations, the first tensor comprises a plurality of dimensions. In some implementations, the one or more tensors of each sample of the multi-dimensional sample dataset are stored in one or more binary chunks, and the respective identifier of each tensor of the one or more tensors corresponds to a column in the respective dataset.

Another aspect of the present disclosure is directed to a method. The method includes identifying a query for a sample dataset. Each sample of the multi-dimensional sample dataset includes one or more tensors. Each tensor of the one or more tensors has a respective identifier that is common to each sample of the multi-dimensional sample dataset. The query specifies a sampling operation for the multi-dimensional sample dataset and identifying a first weight for a first value of a first tensor of the multi-dimensional sample dataset. The method includes parsing the query to extract the sampling operation and the first weight. The method includes executing the query based on the sampling operation to generate a set of query results comprising a first number of indices from a subset of samples of the multi-dimensional sample dataset having the first value for the first tensor, the first number determined based on the first weight. The method includes providing the set of query results as output.

In some implementations, the query further specifies a mathematical operation for a value of the first tensor, and the set of query results further comprises a respective set of references to portions of a result dataset generated based on the mathematical operation. In some implementations, executing the query includes generating one or more functors based on the sampling operation specified in the query, a condition specified in the query, or a requested shape specified in the query. In some implementations, the method includes generating a computational graph based on the one or more functors.

In some implementations, the query comprises at least one SQL keyword. In some implementations, the query specifies a shuffle operation, and the set of query results is randomly ordered based on the shuffle operation. In some implementations, the first tensor comprises a plurality of dimensions. In some implementations, the one or more tensors of each sample of the multi-dimensional sample dataset are stored in one or more binary chunks, and the respective identifier of each tensor of the one or more tensors corresponds to a column in the respective dataset.

At least one other aspect of the present disclosure is directed to a system. The system can identify a query for a multi-dimensional sample dataset. Each sample of the multi-dimensional sample dataset includes one or more tensors.

Each tensor of the one or more tensors includes a respective identifier that is common to each sample of the multi-dimensional sample dataset. The query specifies a sampling operation for the multi-dimensional sample dataset and identifying a first weight for a first value of a first tensor of the multi-dimensional sample dataset. The system can parse the query to extract the sampling operation and the first weight, and execute the query based on the sampling operation to generate a set of query results comprising a first number of indices from a subset of samples of the multi-dimensional sample dataset having the first value for the first tensor. The first number is determined based on the first weight. The system can provide, as output, the set of query results.

In some implementations, the query further specifies a mathematical operation for a value of the first tensor, and the set of query results further comprises a respective set of references to portions of a result dataset generated based on the mathematical operation. In some implementations, executing the query includes generating one or more functors based on the sampling operation specified in the query, a condition specified in the query, or a requested shape specified in the query. In some implementations, the system can generate a computational graph based on the one or more functors.

In some implementations, the query includes at least one SQL keyword. In some implementations, the query specifies a shuffle operation, and the set of query results is randomly ordered based on the shuffle operation. In some implementations, the first tensor comprises a plurality of dimensions. In some implementations, the one or more tensors of each sample of the multi-dimensional sample dataset are stored in one or more binary chunks, and the respective identifier of each tensor of the one or more tensors corresponds to a column in the respective dataset.

At least one other aspect of the present disclosure is directed to a method. The method includes identifying a query over a multi-dimensional sample dataset. Each sample of the multi-dimensional sample dataset includes one or more tensors. Each tensor of the one or more tensors has a respective identifier that is common to each sample of the multi-dimensional sample dataset. The query specifies a transformation operation and a first identifier of a first tensor of the multi-dimensional sample dataset. The method includes parsing the query to extract the first identifier and the transformation operation. The method includes executing the query based on the first identifier to generate a set of query results comprising a respective set of references to portions of a result dataset generated based on the transformation operation and the first tensor of at least a subset of samples of the multi-dimensional sample dataset. The method includes providing the set of query results as output.

In some implementations, the transformation operation is a crop operation, and the respective set of references corresponds to cropped portions of the multi-dimensional sample dataset. In some implementations, the transformation operation is a normalization operation, and respective set of references correspond to normalized portions of the multi-dimensional sample dataset. In some implementations, executing the query includes generating one or more functors based on the first identifier specified in the query, a condition specified in the query, or a requested shape specified in the query. In some implementations, the method includes generating, by the one or more processors, a computational graph based on the one or more functors.

In some implementations, the query comprises at least one SQL keyword. In some implementations, the query specifies a shuffle operation, and the respective set of references is randomly ordered based on the shuffle operation. In some implementations, the first tensor comprises a plurality of dimensions. In some implementations, the one or more tensors of each sample of the multi-dimensional sample dataset are stored in one or more binary chunks, and the respective identifier of each tensor of the one or more tensors corresponds to a column in the respective dataset.

At least one aspect of the present disclosure is directed to a system. The system includes one or more processors coupled to memory. The system can identify a query over a multi-dimensional sample dataset. Each sample of the multi-dimensional sample dataset includes one or more tensors. Each tensor of the one or more tensors has a respective identifier that is common to each sample of the multi-dimensional sample dataset. The query specifies a transformation operation and a first identifier of a first tensor of the multi-dimensional sample dataset. The system can parse the query to extract the first identifier and the transformation operation. The system can execute the query based on the first identifier to generate a set of query results comprising a respective set of references to portions of a result dataset generated based on the transformation operation and the first tensor of at least a subset of samples of the multi-dimensional sample dataset. The system can provide the set of query results as output.

In some implementations, the transformation operation is a crop operation, and the respective set of references corresponds to cropped portions of the multi-dimensional sample dataset. In some implementations, the transformation operation is a normalization operation, and respective set of references correspond to normalized portions of the multi-dimensional sample dataset. In some implementations, the system can execute the query by performing operations comprising generating one or more functors based on the first identifier specified in the query, a condition specified in the query, or a requested shape specified in the query. In some implementations, the system can generate a computational graph based on the one or more functors.

In some implementations, the query comprises at least one SQL keyword. In some implementations, the query specifies a shuffle operation, and the respective set of references is randomly ordered based on the shuffle operation. In some implementations, the first tensor comprises a plurality of dimensions. In some implementations, the one or more tensors of each sample of the multi-dimensional sample dataset are stored in one or more binary chunks, and the respective identifier of each tensor of the one or more tensors corresponds to a column in the respective dataset.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification. Aspects can be combined, and it will be readily appreciated that features described in the context of one aspect of the invention can be combined with other aspects. Aspects can be implemented in any convenient form, for example, by appropriate computer programs, which may be carried on appropriate carrier media (computer readable media), which may be tangible carrier media (e.g., disks) or intangible carrier media (e.g., communications signals). Aspects may also be implemented using any suitable apparatus, which may take the form of programmable computers running computer programs arranged to implement the aspect. As used in the specification and in the claims, the singular forms of 'a,' 'an,' and 'the' include plural referents unless the context clearly dictates otherwise.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 2 illustrates a block diagram of an example data lake in which a sample including multiple tensors, and the portions of chunks corresponding thereto, is indicated, in accordance with one or more implementations;

DETAILED DESCRIPTION

Figure 1:
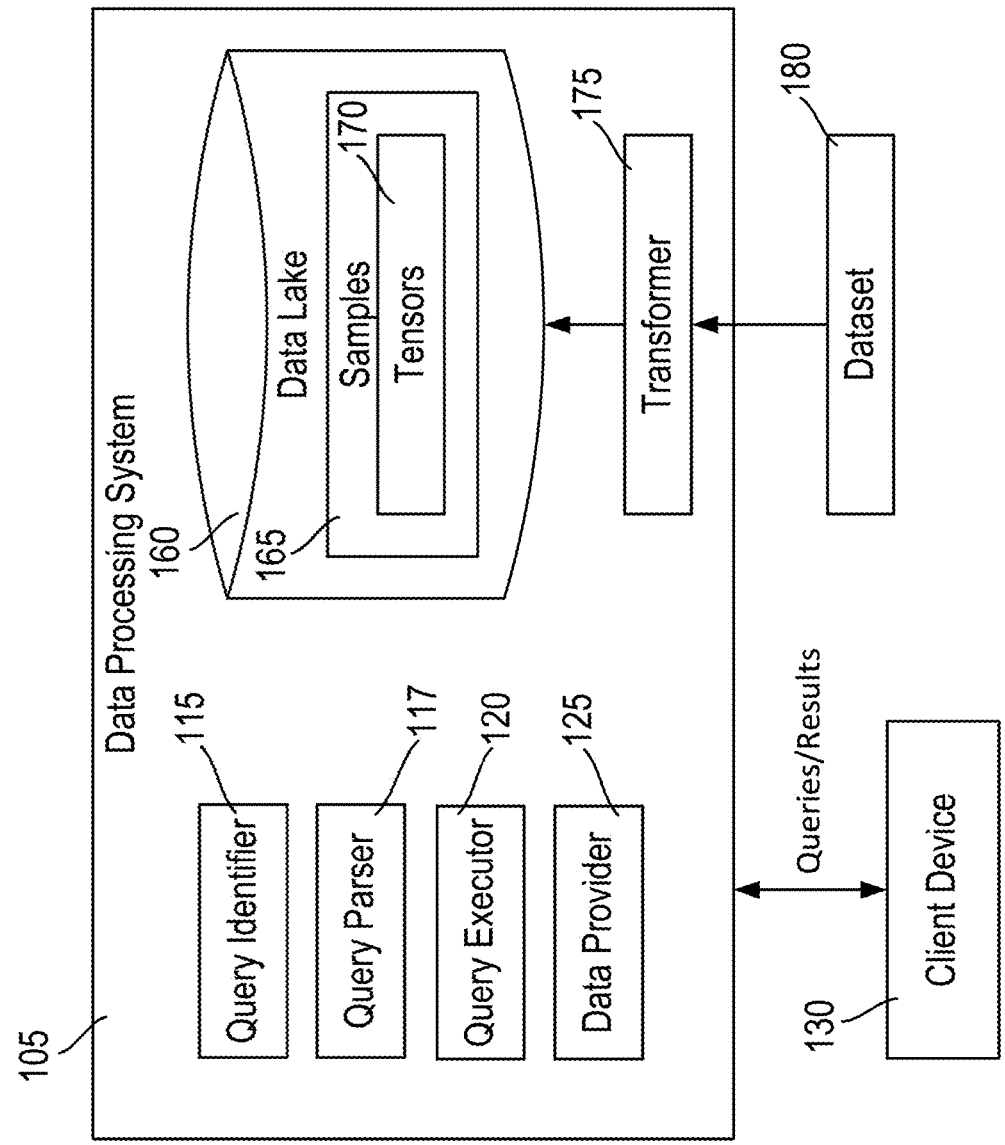
FIG. 1 illustrates a block diagram of an example data processing system that identifies, parses, and executes queries for multi-dimensional sample datasets of tensors, in accordance with one or more implementations.

Below are detailed descriptions of various concepts related to, and implementations of, techniques, approaches, methods, apparatuses, and systems for executing queries on tensor datasets. The various concepts introduced above and discussed in greater detail below may be implemented in any of numerous ways, as the described concepts are not limited to any particular manner of implementation. Examples of specific implementations and applications are provided primarily for illustrative purposes.

Referring generally to the figures, systems and methods for executing queries on multi-dimensional sample datasets, including tensors, are shown and described. A data processing system can identify a query for a multi-dimensional sample dataset. The query can specify a range of a dimension of a tensor of the multi-dimensional sample dataset. The data processing system can parse the query, and execute the query to generate a set of query results. The set of query results can be provided as output. Additional operations may also be specified in queries, such as grouping operations, ungrouping operations, sampling operations, and transformation operations. Each sample of the dataset can include, or be composed of, one or more tensors. Tensors can be multi-dimensional arrays (e.g., n-dimensional arrays). For example, a tensor can be a first order tensor (e.g., a scalar), a second order tensor (e.g., a vector), a third order tensor (e.g., e.g., a matrix), a fourth order tensor, or any other higher order tensor. The data processing system can execute queries that efficiently retrieve tensor data from samples of the multi-dimensional sample dataset that satisfy the queries.

Using the techniques described herein, a data processing system can translate a dataset into tensors and chunk the tensors, e.g., store the tensors as binary data within chunks of predefined sizes that include headers. Instead of storing each sample as its own file within a file system, or storing each tensor as its own file, the data processing system can dynamically retrieve bit or byte ranges of the chunks corresponding to tensors of specific samples that correspond to conditions specified in tensor queries. The tensor queries can further include range-based requests for portions of tensors, and may specify conditions, nested sub-queries, or transformation operations to perform on the retrieved data.

When retrieving the data, instead of retrieving an entire chunk, which may be significantly large (e.g., 5 megabytes (MB), LOMB, 15 MB, 20 MB, etc.), the data processing system can identify which samples (or portions of the tensors thereof) that satisfy a query that has been provided, and automatically and dynamically retrieve portions of the chunks (e.g., a bit or byte range) corresponding to the tensors (or portions thereof) that are identified or selected for retrieval based on the query. Retrieving portions of the chunks, instead of the entire chunks, can greatly reduce the amount of data to be loaded and transported across a network. Additionally, the techniques described herein provide a flexible query language that is parsed and automatically utilized to generate computational tasks to efficiently retrieve and process tensor data implicated by different queries. This reduces overall memory resource consumption, improves processing efficiency, and reduces overall network resource usage.

Referring now to FIG. 1, a data processing system 105 is shown that identifies, parses, and executes queries for a multi-dimensional sample dataset. The data processing system 105 can be a server system, a cloud-computing platform, a local computing system, a laptop computer, a desktop computer, a client device, or any other system that can process information. The data processing system 105 can be or include one or multiple computing nodes, servers, or distributed processing systems. The data processing system 105 can include a query identifier 115, a query parser 117, a query executor 120, a data provider 125, a data lake 160, and a transformer 175. The query identifier 115, the query parser 117, the query executor 120, the data provider 125, the data lake 160, and the transformer 175 can include of software, applications, scripts, code, objects, hardware, the like, or combinations thereof that are configured to perform the various tasks, operations, and techniques described herein.

The query identifier 115, the query parser 117, the query executor 120, the data provider 125, the data lake 160, and the transformer 175 can be implemented on a single data processing system 105 or implemented on multiple, separate data processing systems 105. The query identifier 115, the query parser 117, the query executor 120, and the data provider 125 can be pieces of computer software, modules, software components, combinations of hardware and software components, or the like. Although various processes are described herein as being performed by the data processing system 105, it should be understood said operations or techniques may also be performed by other computing devices (e.g., the client device 130), either individually or via communications with the data processing system 105. Similarly, the client device 130 may include one or more of the components (e.g., the query identifier 115, the query parser 117, the query executor 120, and the data provider 125) of the data processing system 105, and may carry out any of the various functionalities described herein.

The data lake 160 can be or include a data repository, a database, a set of databases a storage medium, a storage device, etc. The data lake 160 can store structured or unstructured datasets 180. The data lake 160 can store one or multiple different datasets 180. The data lake 160 can be a computer-readable memory that can store or maintain any of the information described herein. The data lake 160 can store or maintain one or more data structures, which may contain, index, or otherwise store each of the values, pluralities, sets, variables, vectors, numbers, or thresholds described herein. The data lake 160 can be accessed using one or more memory addresses, index values, or identifiers of any item, structure, or region maintained in the data lake 160. The data lake 160 can be accessed by the components of the data processing system 105, or any other computing device described herein, for example, via suitable communications interface, a network, or the like. In some implementations, the data lake 160 can be internal to the data processing system 105. In some implementations, the data lake 160 can exist external to the data processing system 105, and may be accessed via a network or communications interface. The data lake 160 may be distributed across many different computer systems or storage elements.

The data processing system 105 or the client device 130 can store, in one or more regions of the memory of the data processing system 105, or in the data lake 160, the results of any or all computations, determinations, selections, identifications, generations, constructions, or calculations in one or more data structures indexed or identified with appropriate values. Any or all values stored in the data lake 160 may be accessed by any computing device described herein, such as the data processing system 105, to perform any of the functionalities or functions described herein.

In some implementations, a computing device, such as a client device 130, may utilize authentication information (e.g., username, password, email, etc.) to show that the client device 130 is authorized to access information the data lake 160 (or a particular portion of the data lake 160). The data lake 160 may include permission settings that indicate which users, devices, or profiles are authorized to access certain information stored in the data lake 160. In some implementations, instead of being internal to the data processing system 105, the data lake 160 can form a part of a cloud computing system. In such implementations, the data lake 160 can be a distributed storage medium in a cloud computing system and can be accessed by any of the components of the data processing system 105, by the one or more client devices 130 (e.g., via one or more user interfaces, etc.), or any other computing devices described herein.

The data lake 160 can store one or more samples 165 in one or more data structures, such as the chunks described in connection with FIG. 2. Each sample 165 can be, include, be associated with, or correspond to, one or more tensors 170. The tensors 170 can include multi-dimensional arrays (e.g., n-dimensional arrays). For example, a tensor 170 can be a first order tensor (e.g., a scalar), a second order tensor (e.g., a vector), a third order tensor (e.g., e.g., a matrix), a fourth order tensor, or any other higher order tensor. The tensors 170 can include image data, text data, audio data, video data (e.g., frames, etc.), tags, labels, binary code, or any other type of data that may be utilized in machine-learning processes or operations. For example, one sample 165 could include an image tensor 170 and a label tensor 170 that classifies the image tensor 170.

Tensors 170 can include information relating to supervised learning, such as ground truth classifications, labels, bounding boxes or other types of information relating to other tensors 170 of a sample 165. The ground truth data may include a label for an object in an image, a mask identifying pixels associated with an object in an image, a depth map indicating depth associated with pixels in an image, a bounding box identifying an object in an image, or the like. The tensors 170 of a sample 165 may be included in one or more groups. For example, when the dataset 180 is on-boarded to the data lake 160, a file (e.g., an image, video, audio file) can be converted into a tensor format and grouped with a corresponding label tensor 170 for the file. For example, a picture of a handwritten number, e.g., the number nine, could be a first tensor 170 while a label that classifies the picture as the number nine could be a second tensor 170, each of which are included as part of a single sample 165. An example representation of various data structures that store the samples 165, and the tensors 170 thereof, is described in connection with FIG. 2.

Referring to FIG. 2 in the context of the components described in connection with FIG. 1, an example data structure 200 (e.g., which may be, or may be stored in, the data lake 160) is shown where a sample 165, including multiple tensors 170, is stored in multiple chunks 205. The data structure 200 can store chunks 205 in columns, rows, a matrix, or other suitable data structures. The data structure 200, although represented as a table, may be stored or distributed in any suitable form, such that the information relating to the tensors 170 and the samples 165 can be utilized in connection with the techniques described herein. The data structure 200 can utilize columnar storage architecture, with tensors 170 stored in columns. Each tensor 170 can be stored in a collection of chunks 205, which can be binary blobs that contain the data samples 165. An index map (e.g., represented as the "Index" column in the data structure 200) associated with each tensor 170 maps the corresponding chunk 205 and index of the sample 165 within that chunk 205 for a given sample index.

In some implementations, each column of the data lake 160 can represent a specific tensor type (e.g., associated with a corresponding tensor identifier, shown in the data structure 200 as the column header), the binary data of which is stored in corresponding chunks 205. The binary data stored in the chunks 205 can include or represent multi-dimensional arrays (e.g., tensor 170 data, etc.). In some implementations, each column may store tensors 170 having different numbers of dimensions (e.g., each column can represent a tensor 170 having a different order or different tensor 170 size). For example, a tensor 170 stored in the column identified as "image" can be a third order tensor, shown as stored in the left-most column, while the column identified as "labels" can be a first order tensor 170.

The data structure 200 includes samples 165 that are represented as a single row indexed across parallel tensors 170. As opposed to a document storage format, sample 165 elements can be logically independent, which enables partial access to samples 165 for running performant queries or streaming selected tensors over the network to graphics processing unit (GPU) training instances. Multiple tensors 170 can be grouped. Groups implement syntactic nesting and define how tensors 170 are related to each other. Syntactic nesting avoids the format complication for hierarchical memory layout. Changes to the schema of the data structure 200 can be tracked over time with version control, similar to dataset content changes. The data structure 200 can include a large number of samples 165, and may be referred to as a multi-dimensional sample dataset.

Each row of the data structure 200 can be associated with an index (e.g., a sample index or sample identifier), which corresponds to a respective sample 165. The index may itself be a tensor 170 (e.g., a scalar value identifying a specific sample 165). The tensors 170 can be typed and can be appended or modified in-place. Default access to an index or a set of indices can return the data as arrays or other suitable data structures (e.g., NumPy arrays, etc.). The tensors 170 can accommodate n-dimensional data, where the first dimension may correspond to the index or batch dimension. The tensors 170 can include dynamically shaped arrays, also called ragged tensors, as opposed to other statically chunked array formats. The tensors 170 may also have a variety of metadata, such as types, that describe the content or format of the tensor data.

One type of metadata is the "htype" of the tensor 170. The htype of a tensor 170 can define the expectations on samples in a tensor such as data type (e.g., analogous to dtype in NumPy), shape, number of dimensions, or compression. Typed tensors 170 enable interacting with deep learning frameworks straightforward and enable sanity checks and efficient memory layout. By inheriting from a generic tensor htype, the techniques described herein utilize types such as image, video, audio, bbox, dicom, among others, to categorize different tensors. For example, a tensor with image htype would expect samples being appended to it to have dtype as unit8 and shape length 3 (e.g., width, height, and number of channels). The concept of htypes are further extended to allow for meta types that support storing image sequences in tensors (sequence [image]), referencing to remotely stored images, while maintaining the regular behavior of an image tensor (link[image]), or even possible cross-format support.

In some implementations, the metadata (including the htype) of the tensor can be utilized to determine how to process or display the data contained within the corresponding tensor 170, or how to access and process (e.g., based on the tensor shape determined based on the htype) the data within the tensor 170. For example, the data processing system 105 or the use the type feature to determine how to render, draw, or display a particular tensor 170 in a graphical user interface (e.g., the graphical user interface 1000 described in connection with FIG. 10). The metadata for the tensors 170 can be stored with each tensor 170 in the chunks 165, in headers of the chunks 165, or in a separate data storage element. Table 1 below indicates various metadata corresponding to example tensors 170, and includes data types of the tensors 170, tensor types, sample compression (or tensor compression), chunk compression, and tensor shape:

TABLE 1

| Tensor Name | Images | Labels | Boxes | Masks |
| --- | --- | --- | --- | --- |
| Data Type | uint8 | uint32 | float32 | bool |
| Tensor Type | image | class label | bbox | binary mask |
| Sample Compression | jpg | None | None | lz4 |
| Chunk Compression | None | None | None | None |
| Shape | (118287, 10:640, 59:640, 1:3) | (118287, 1,) | (118287, 0:93, 4,) | (118287, 51:640, 59:640, 0:93) |

Individual tensors 170, chunks, or samples 165 (or portions thereof stored within the tensors) may be compressed during onboarding using a suitable compression algorithm. The compression algorithm may be selected based on the type of data that is being compressed. For example, images may be compressed using a first compression algorithm or format encoding, while labels may be compressed using a second, different compression or encoding. When the information in the tensors 170 are retrieved and processed, decompression may be performed by the requesting computing device, or may be performed by the computing device providing the tensors 170.

In some implementations, the data structure 200 may include a provenance file in JavaScript Object Notation (JSON) format and folders per tensor. A tensor 170 may itself include chunks 205, a chunk encoder, a tile encoder, and tensor metadata. The tensors 170 can be optionally hidden. For instance, hidden tensors can be used to maintain down-sampled versions of images or preserve shape information for fast queries. The status of a tensor (hidden or visible) may be stored as part of the metadata associated with the respective tensor. The tensors 170 can be stored in chunks 205 at the storage level. While statically (inferred) shaped chunking avoids maintaining a chunk map table, it introduces significant user overhead during the specification of the tensor, custom compression usage limitations, underutilized storage for dynamically shaped tensors, and post-processing inefficiencies. The systems and methods described herein utilize chunks 205 that can be constructed or generated based on the lower and upper bound of the chunk size to fit a limited number of samples. The data structure 200 can include or may be stored in association with a compressed index map that preserves the sample index to chunk 205 identifier mapping per tensor 170 while enabling chunk 205 sizes in the range optimal for streaming while accommodating mixed-shape samples.

The data structure 200 storage format can be optimized for deep learning training and inference, including sequential and random access. Sequential access is used for running scan queries, transforming tensors 170 into other tensors 170, or running inference. Random access use cases include multiple annotators writing labels to the same image or models storing back predictions along with the dataset, as well as accessing queried data. While the strict mode is disabled, out-of-the-bounds indices of a tensor 170 can be assigned, thus accommodating sparse tensors.

An on-the-fly re-chunking algorithm is implemented to optimize the data layout. The data process system 105 can access the data lake 160 using shuffled stream access for training machine-learning models. Shuffled stream access can utilize random or custom order access while streaming chunks 205 into the training process. This is achieved by involving range-based requests to access sub-elements inside chunks 205, running complex queries before training to determine the order, and maintaining a buffer cache of fetched and unutilized data. Each tensor 170 can have its own chunks, and the default chunk size is 8 MB. A single chunk 205 can include of data from multiple indices when the individual data points (image, label, annotation, etc.) are smaller than the chunk size. When individual data points (e.g., such as large images) are larger than the chunk size, the data is split among multiple chunks using a tiling technique. Exceptions to chunking logic are video data, which can be stored as a sequence of frames.

Referring back to FIG. 1, the data processing system 105 or the client device 130 can retrieve samples 165 from the data lake 160 by retrieving tensors 170 from multiple chunks (e.g., the chunks 205). For example, if the data processing system 105 receives a request from the client device 130 to retrieve a particular sample 165 corresponding to a particular identifier, the data processing system 105 can retrieve tensors 170 from the chunks corresponding to the respective identifier. This process can be repeated for each requested sample 165 or portion of a sample 165. For example, in some implementations, an executed query may retrieve one or more tensors 170 of a sample (or range-based portions thereof) rather than the whole sample in its entirety. The data processing system 105 can read or retrieve different bit or byte ranges of the chunks 165 to retrieve each requested tensor 170 (or portions of particular tensors 170). The data processing system 105 can provide the tensors 170 of the samples 165 implicated by a query for further processing, display, or as output, using the techniques described herein.

In some implementations, the data processing system 105 can construct, generate, build, implement, or create a graphical user interface, which may be provided for display on the client device 130, and may display various data relating to queries or query results. For example, the graphical user interface may display various samples 165, tensors 170, or portions thereof. In some implementations, the data processing system 105 may provide display instructions to the client device 130 that cause the graphical user interface to be constructed, displayed, or rendered on the client device 130. The client device 130 may provide information, such as queries, via the graphical user interface. An example graphical user interface is described in further detail in connection with FIG. 10.

Figure 10:
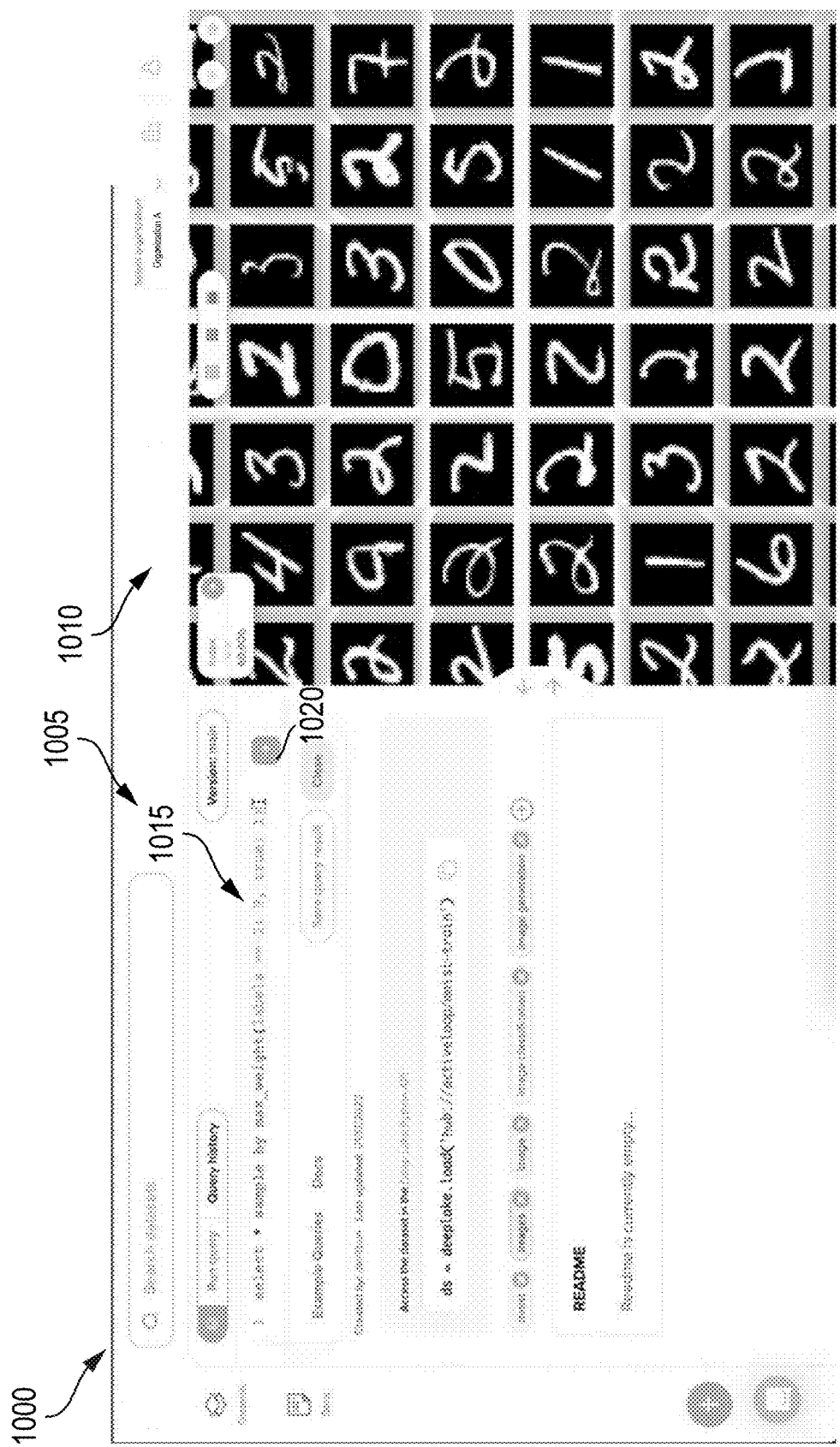
FIG. 10 illustrates an example user interface in which tensor queries can be provided and the results of the tensor queries can be displayed, in accordance with one or more implementations.

Referring to FIG. 10, illustrated is an example user interface 1000 in which tensor queries can be provided and the results of the tensor queries can be displayed, in accordance with one or more implementations. The graphical user interface 1000 can include the field 1015. The field 1015 can be a box, a text entry element, a rectangle, or any other shape. As shown, the graphical user interface 1000 is shown including a first window 1005 where a user enters a query in the field 1015. The field 1015 can be configured to receive text written or selected by a user via a client device (e.g., the client device 130). The query can specify one or more tensors, conditions, operations, or sub-queries, as described herein. The graphical user interface 1000 includes a region 1010 where samples (e.g., the samples 165) of a multi-dimensional dataset that satisfy an entered query are displayed.

Once a query has been provided via the field 1015, an interaction with the interactive user interface element 1020 can cause the client device to request that the query be executed (e.g., by a function or process executing on the client device 130, by the data processing system 105, etc.). In some implementations, the client device can transmit the query to a data processing system (e.g., the data processing system 105). In some implementations, the client device may execute the query locally, and may retrieve one or more tensors (or portions thereof) from the data lake 160. In some implementations, the data processing system can store, persist, or maintain the query data (e.g., in a historic repository in association with a user profile used to access the data processing system 105). The query can then be executed, and the results of the query may be provided to the client device for display in the region 1010.

Referring back to FIG. 1, the data processing system 105 may utilize the transformer 175 to onboard one or more datasets 180. The transformer 175 may be software, hardware, or combinations thereof that can receive a structured or unstructured dataset 180 and transform the dataset 180 for storage in the data lake 160. The unstructured dataset 180 can include images (e.g., JPEG images, PNG images, GIF, SVG, etc.), videos (MP4, MOV, WMV, AVI), audio (e.g., MP3, MP4, WAV), labels or classifications for the images, text data, videos, or audio, bounding boxes that identify specific objects within the images or videos, pose data, depth indications that represent the depth of objects within the images or videos, masks that identify a section of pixels of an image or video that corresponds to a particular classified object, or any other type of data. The transformer 175 can transform the unstructured dataset 180 into tensors 170 of one or more samples 165 in the data lake 160 according to one or more chunks (e.g., the chunks 205).

The transformer 175 can generate the chunks to be or include fragments or portions of binary data. The chunks can have predefined sizes. In some cases, chunks can have a predefined size corresponding to a type of tensor 170 to be saved within the chunk. The chunks can include headers uniquely identifying the chunks and/or including metadata and the chunk can include the binary data of the tensors 170. The headers of the chunks can specify or identify the type of tensors 170 stored within each chunk. Each chunk may include multiple tensors 170. For example, one single chunk can store a tensor 170 of a first image, a tensor 170 of a second image, and a tensor 170 of a third image. The transformer 175 can generate chunks of predefined sizes with the dataset 180. For example, the transformer 175 can generate a first chunk and save tensors 170 of images in the chunk until the chunk is filled. The transformer 175 can then save the chunk to the data lake 160 and begin filling the next chunk. When onboarding a dataset 180 as one or more samples 165, the samples 165 and the tensors 170 corresponding thereto can be stored in association with an identifier of the multi-dimensional sample dataset generated from the dataset 180. The identifier multi-dimensional sample dataset may be provided, for example, by the client device 130 when selecting a particular dataset to process or access via a graphical user interface (e.g., the graphical user interface 1000 of FIG. 10), or when providing a query for the multi-dimensional sample dataset. Examples of transforming unstructured datasets 180 into tensors 170 and chunks is described in detail in U.S. patent application Ser. No. 17/450,848 filed Oct. 14, 2021, the entirety of which is incorporated by reference herein.

In some implementations, the transformer 175 can compress the tensors 170 when the transformer 175 stores the tensors 170 within the data lake 160. The transformer 175 can apply a different type of compression to different types of tensors 170. For example, images can be compressed with PNG, JPEG, or another format. Mask tensors 170 can be compressed with 1z4 compression. The data processing system 105 or the client device 130 can decompress the tensors 170 with a decompression technique based on the tensor type, e.g., the front end system 110 or the client device 130 can decompress image tensors 170 with one technique (e.g., PNG or JPEG) and decompress mask tensors 170 with another technique (e.g., 1z4).

The type features for tensors 170 may be specified (e.g., via a configuration file, via the client device 130, etc.) when the dataset 180 is on-boarded to the data processing system 105 by the transformer 175. The transformer 175 can compare the data entries for a particular tensor 170 against an expected number of values and dimensions associated with the tensor type to validate the datatype selected for the tensor 170. For example, if a bounding box type is specified for a particular array of values, the transformer 175 can verify that the array of values includes a predefined number of values (e.g., four values or a number of values divisible by four). If the array does not include the correct number of values or the data does not include the correct number of dimensions, for example, the transformer 175 can generate an error and the data processing system 105 can present the error within a graphical user interface, or provide an error or notification to the client device 130, with an explanation of the mismatch between the expected data format.

In some implementations, the transformer 175 may perform one or more transformations on the samples 165. The transformer 175 can iterate over each sample 165 over the dataset across the first dimension, and outputs a transformed dataset. The transformer 175 can implement both one-to-one and one-to-many transformations. The transformation can also be applied in place without creating an additional dataset. The transformer 175 can implement a scheduler that batches sample-wise transformations operating on nearby chunks, and schedules them on a process pool. The compute may be delegated to a Ray cluster. Instead of defining an input dataset, the user can provide an arbitrary iterator with custom objects to create ingestion workflows. Users can also stack together multiple transformations and define complex pipelines.

Figure 4:
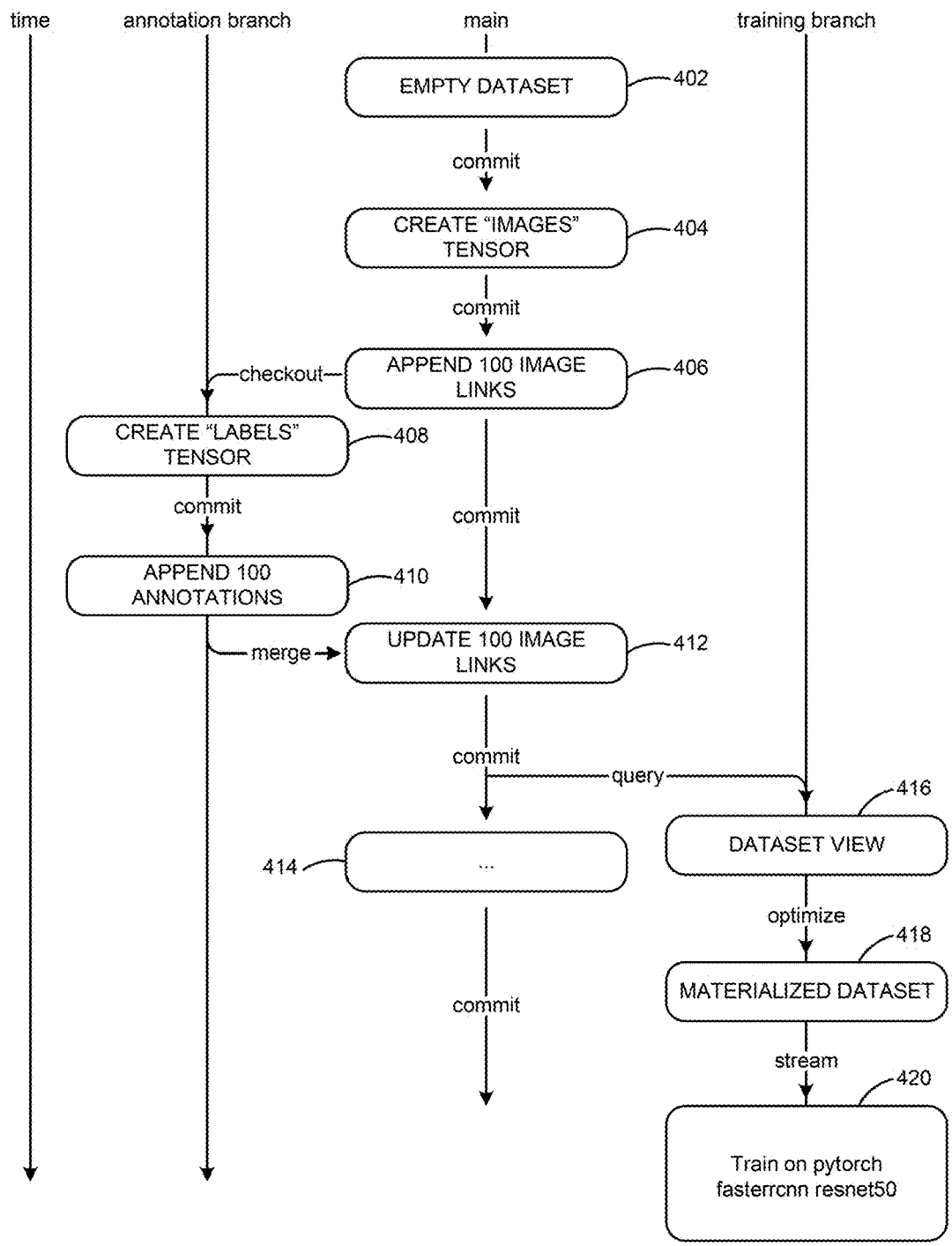
FIG. 4 illustrates a flow diagram of an example process for generating, populating, and utilizing a multi-dimensional sample dataset, in accordance with one or more implementations.

Referring to FIG. 4 in the context of the components described in connection with FIG. 1, illustrated is a flow diagram of an example process 400 for generating, populating, and utilizing a multi-dimensional sample dataset, in accordance with one or more implementations. An example deep learning application process starts begins by collecting a raw set of files (e.g., the dataset 180) on an object storage bucket. The dataset may include images, videos, and other types of multimedia data in their native formats such as JPEG, PNG, or MP4. Any associated metadata and labels may be stored on a relational database. In some implementations, that information can be stored on the same bucket along with the raw data in a normalized tabular form such as CSV, JSON, or Parquet format.

At step 402 of the process 400, an empty dataset is created in the data lake 160 (e.g., by allocating a predetermined region of memory in the data lake 160). Then, empty tensors are defined for storing both raw data as well as metadata. The number of tensors could be arbitrary. A basic example of a sample 165 used an image classification task would have two tensors 170, first, an images tensor with htype of image and sample compression of JPEG, and second, a labels tensor with htype of class label and chunk compression of LZ4. At step 404, the images tensor 170 is created.

At step 406, after declaring tensors, the label data can be appended to the image dataset. If a raw image compression matches the tensor sample compression, the binary can be directly copied into a chunk without additional decoding. Empty labels tensors are generated at step 408, for example, by allocating corresponding regions of memory. Label data is extracted from a SQL query or CSV table into a categorical integer and appended into labels tensor at step 410. The labels tensor chunks are stored using LZ4 compression. All data lake 160 data is stored in the bucket and is self-contained. At step 412, the image tensors 170 of the samples 165 of the multi-dimensional dataset are stored in association with the generated label tensors 170. At step 414, this process can be repeated, for example, until the multi-dimensional dataset has been completely annotated or on-boarded.

At step 416, after storage, the data can be accessed using one or more suitable APIs (e.g., a NumPy interface) or as a streamable deep learning dataloader, or may be visualized using a viewer application or graphical user interface. The data processing system 105 can generate a materialized dataset 418 from the data retrieved from the data lake 160 according to one or more queries, and can then stream the data to a machine-learning process at step 420. The model running on a compute machine iterates over the stream of image tensors, and can store the output of the model in a new tensor called predictions. The prediction tensors 170 may be respectively stored as part of the corresponding samples 165 in the data lake 160.

Referring back to FIG. 1, the client device 130 can be a computer, such as a desktop computer or a laptop computer, a smartphone, a tablet, a server, a computing device, a stationary computing device, a portable computing device, a smartwatch, smart glasses, or any other type of computing or display system, device, or apparatus. The client device 130 can include a user interface for displaying information to a user. The user interface can be a screen, a touch-screen, a resistive touch-screen, a capacitive touch screen, a liquid crystal display (LCD), a light emitting diode (LED) display, a quantum dot LED (QLED) display, an organic light emitting diode (OLED) display, or any other type of display.

The client device 130 can further include output devices such as a speaker or speakers to play audio data, one or more displays to present graphical information, or other types of output devices (e.g., haptic devices, etc.). The client device 130 can include an input device for interacting with, manipulating, or providing data to various graphical user interfaces (e.g., the graphical user interface 1000 of FIG. 10). The input device can be a keyboard, a mouse, a touch-screen, a microphone, or any other type of human machine interface. The client device 130 may execute a local application or a web-based application that can communicate with the data processing system 105. In some implementations, one or more of the operations (e.g., query identification, query parsing, query execution, data provision, any other functionality described herein, etc.) implemented by the data processing system 105 or the components thereof may instead be performed locally by the client device 130. In some implementations, the client device 130 may provide, indicate, or initiate onboarding of the dataset 180 into the samples 165 in the data lake 160.

The client device 130 may utilize a graphical user interface, such as the graphical user interface 1000 described herein, to provide one or more queries that can be executed by the data processing system 105 according to the techniques described herein. In some implementations, the client device 130 may execute one or more APIs (e.g., a Python API, etc.) of the data processing system 105 to provide the query, rather than provide the query via a graphical user interface. The API may be implemented as part of a machine-learning pipeline or flow, such as the machine-learning flows described in connection with FIGS. 3 and 5.

In some implementations, the client device 130 can perform one or more of the functionalities relating to tensor query processing. For example, in some implementations, the data processing system 105 may simply be a data repository for the data lake 160 (and any associated metadata), and the client device 130 may include the query identifier 115, the query parser 117, the query executor 120, and the data provider 125, and may perform any of the functionality of the data processing system 105. In some implementations, one or more of the functionalities of the query identifier 115, the query parser 117, the query executor 120, and the data provider 125 may be executed across both the client device 130 and the data processing system 130, via communications between the devices.

Figure 3:
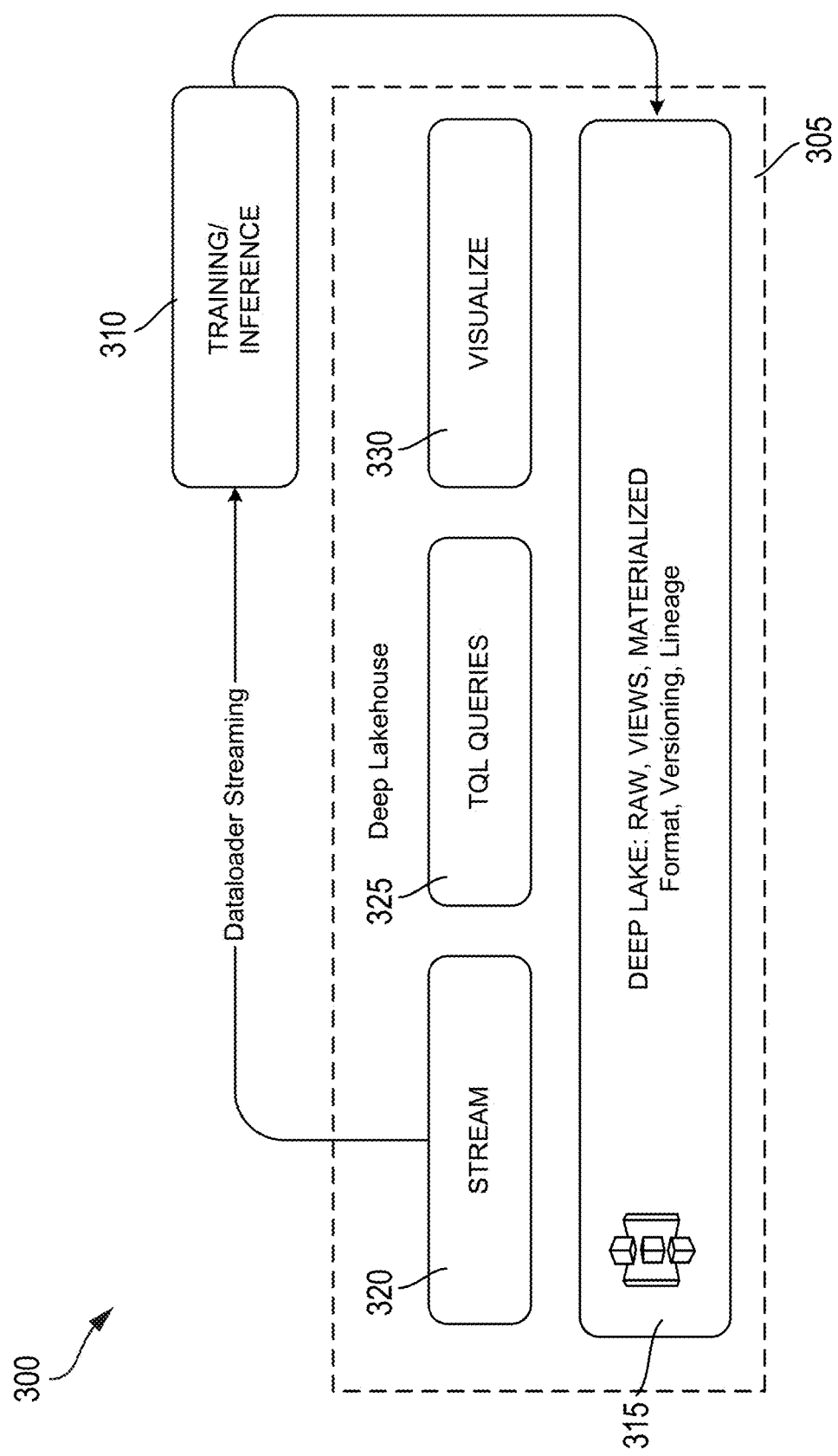
FIG. 3 illustrates a block diagram of an example architecture that implements the techniques described herein while integrating with deep learning frameworks, in accordance with one or more implementations.

Prior to discussing the particular query functionality of the present disclosure, a brief overview of the use of data lakes (e.g., the data lakes 160) in a machine-learning flow will be provided. Referring to FIG. 3 in the context of the components described in connection with FIG. 1, illustrated is a block diagram 300 of an example architecture that implements the techniques described herein while integrating with deep learning frameworks, in accordance with one or more implementations. As shown, the deep lakehouse 305 integrates with a training/inference 310 system. The deep lakehouse 305 may include, for example, the data processing system 105 or the client device 130. For example, the deep lake 315 may be or may include the data lake 160. The deep lakehouse 305 can include a streaming component 320, which may stream data to the training/inference system 310. The deep lakehouse 305 can store or maintain one or more TQL queries 325, which may include one or more tensor queries that may be executed by the deep lakehouse 305 using the techniques detailed herein. The deep lakehouse 305 can include a visualizer component 330, which can present graphical user interfaces that visually display one or more samples 165 (or tensors 170 thereof). The training/inference system 310 can be any type of computing system or process that utilizes the data streamed from the streaming component 320 (e.g., one or more samples 165 or the tensors 170 thereof, etc.).

Figure 5:
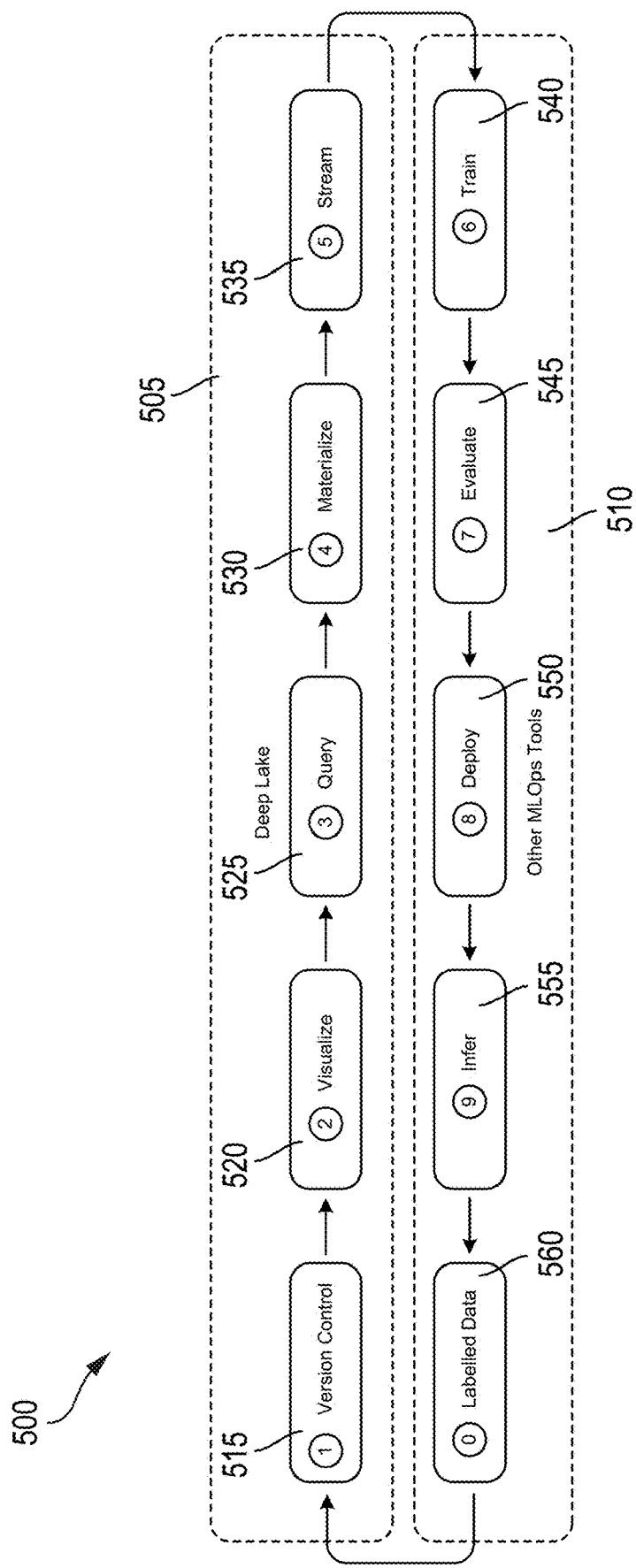
FIG. 5 illustrates a data flow diagram of an example machine-learning process that utilizes the techniques described herein, in accordance with one or more implementations.

Referring to FIG. 5 in the context of the components described in connection with FIG. 1, illustrated is a data flow diagram 500 of an example machine-learning system 510 that utilizes a deep lake system 505 according to the various techniques described herein, in accordance with one or more implementations. The deep lake system 505 may include, for example, the data processing system 105 or the client device 130. The data processing system 105 or the client device 130 may perform any of the functionality described in connection with the deep lake system 505. In some implementations, the deep lake system 505 or may include the data lake 160 and various software components that process or otherwise interact with the data lake 160. For example, the deep lake system 505 may perform a version control process 515 on the data lake 160, may perform a visualization process 520 on the data lake 160, may perform query operations 525 on the data lake 160, may perform a materialization process 530 on one or more samples 165 of the data lake 160 (e.g., based on query results, as described herein), and perform a streaming process 535 on said data to provide the data to the machine-learning system 510.

The deep lake system 505 can perform a version control process 515 on the data lake 160. The version control process 515 can be used to addresses the need for the reproducibility of experiments and compliance with a complete data lineage. Different versions of the dataset can be stored in the data lake 160, separated by sub-directories, by the version control process 515. Each sub-directory can act as an independent dataset (e.g., set of samples 165) with its own metadata files. Unlike a non-versioned dataset, these sub-directories include chunks modified in the particular version, along with a corresponding chunk set per tensor 170 including the names of all the modified chunks. A version control info file present at the root of the directory can track of the relationship between these versions as a branching version-control tree.

While accessing any chunk of a tensor at a particular version, the version control process 515 can traverse the version control tree is starting from the current commit, heading towards the first commit. During the traversal, the chunk set of each version is checked for the existence of the required chunk. If the chunk is found, the traversal is stopped, and data is retrieved. For keeping track of differences across versions, for each version, a commit diff file is also stored per tensor, which improves computational efficiency when comparing across versions and branches. Moreover, the identifiers of samples 165 can be generated and stored during the dataset population, which can be used to keep track of the same samples during merge operations. The functionality of the version control process 515 can be accessed via one or more APIs (e.g., a Python API, etc.), which versioning of datasets within their data processing scripts without switching back and forth from a command line interface. The version control process 515 supports the following commands: Commit, which creates an immutable snapshot of the current state of the dataset; Checkout, which checks out to an existing branch/commit or creates a new branch if one doesn't exist; Diff, which compares the differences between 2 versions of the dataset; and Merge, which merges two different versions of the dataset, resolving conflicts according to the policy defined by the user.

The deep lake system 505 can perform a visualization process 520 on the data lake 160. The visualization process 520 can provide fast and seamless visualization of tensors 170 in samples 165, which allows faster data collection, annotation, quality inspection, and training iterations. The visualization process 520 can provide a web interface for visualizing large-scale data directly from the source. The visualization process 520 can utilize the htype of the tensors to determine the best layout for visualization. Primary tensors, such as image, video, and audio can be displayed first, while secondary data and annotations, such as text, class label, bbox, and binary mask are overlayed. The visualizer also considers the meta type information, such as sequence to provide a sequential view of the data, where sequences can be played and jump to the specific position of the sequence without fetching the whole data, which is relevant for video or audio use cases. The visualization process 520 addresses critical needs in machine-learning workflows, enabling users to understand and troubleshoot the data, depict its evolution, compare predictions to ground truth or display multiple sequences of images (e.g., camera images and disparity maps) side-by-side.

The deep lake system 505 can perform query operations 525 on the data lake 160. The query operations are described in further detail herein, including in the descriptions of FIGS. 11, 12, 13, 14, and 15. The query operations 525 may be executed by the data processing system 105 or by the client device 130. Querying and balancing datasets can be utilized in training deep learning workflows. This can be performed within a dataloader using sampling strategies or separate pre-processing steps to sub-select the dataset. To resolve the gap between the format and fast access to the specific data, the query operations 525 can provide an embedded SQL-like query engine called TQL.

The query operations 525 can be used to generate a computational graph of tensor operations. Then a scheduler (e.g., of the data processing system 105, the client device 130, etc.) executes the query graph. Execution of the query may be delegated to external tensor computation frameworks such as PyTorch or XLA and efficiently utilize underlying accelerated hardware. In addition to standard SQL features, TQL can implement numeric computation. Traditional SQL does not support multidimensional array operations such as computing the mean of the image pixels or projecting arrays on a specific dimension. The query operations 525 solves these and other uses by enabling Python or NumPy-style indexing, slicing of arrays, and providing a large set of convenience functions to work with arrays.

Additionally, the query operations 525 enable deeper integration of the query with other features of the deep lake system 505, such as the version control process 515, the streaming process 535, and the visualization process 520. For example, the query operations 525 allow querying data on specific versions or potentially across multiple versions of a dataset. The query operations 525 also support specific instructions to customize the visualization of the query result or seamless integration with the dataloader for filtered streaming. The query operations 525 may be embedded, and execute along with the client device 130 either while training a model on a remote compute instance or in-browser compiled over WebAssembly. In some implementations, the query operations 525 may be implemented in a cloud computing system, one or more servers, or one or more specialized computing systems. The query operations 525 extend SQL with numeric computations on top of multi-dimensional sample datasets. The query operations 525 can be utilized to generate views of datasets, which can be visualized or directly streamed to deep learning frameworks.

The deep lake system 505 can perform a materialization process 530 on one or more samples 165 of the data lake 160 (e.g., based on query results, as described herein). Raw data used for deep learning may be stored as raw files (e.g., compressed in formats like JPEG), either locally or on the cloud. One way to construct datasets is to preserve pointers to these raw files in a database, query this to get the required subset of data, fetch the filtered files to a machine, and then train a model iterating over files. In such approaches, data lineage needs to be manually maintained with a provenance file.

However, the data lake 160 simplifies these steps using linked tensors in a tensor storage format (e.g., the format described in connection with FIG. 2), which may include storing pointers (links/uniform resource locators (URLs) or uniform resource identifiers (URIs) to one or multiple cloud providers) to the original data. The pointers within a single tensor can be connected to multiple storage providers, thus enabling a consolidated view of their data present in multiple sources. Any of the functionality of the deep lake system 505 or the components thereof can be used with linked tensors. The materialization process 530 can be utilized to transform the dataset view into an optimal layout to stream into deep learning frameworks to iterate faster. The materialization process 530 involves fetching the actual data from links or views and efficiently laying it out into chunks. Data may also be fetched directly from the data lake 160 (e.g., from one or more disparate chunks). Performing this step towards the end of machine-learning workflows leads to minimum data duplication while ensuring optimal streaming performance and minimal data duplication, with full data lineage.

The deep lake system 505 can perform a streaming process 535 (sometimes referred to as a "streaming dataloader" or a "dataloader") on datasets to provide the data to the machine-learning system 510. As datasets become larger, storing and transferring the data therein over a network from a remotely distributed storage becomes inevitable and challenging. The streaming process 535 enables training models without waiting for all of the data to be copied to a local machine. The streaming process 535 ensures data fetching, decompression, applying transformations, collation, and data handover to the training model. The streaming process 535 can delegate highly parallel fetching and in-place decompressing per process to avoid global interpreter lock. The streaming process 535 can pass the in-memory pointer to a user-defined transformation function, and collate before exposing the data to the training loop in deep learning native memory layout. Transformation may concurrently execute in parallel, and may utilize native library routine calls.

The information form the streaming process 535 can be provided to the training process 540 of the machine-learning system 510. The training process 540 can be utilize to train deep learning models, for example. Deep learning models are trained at multiple levels in an organization, ranging from exploratory training occurring on personal computers to large-scale training that occurs on distributed machines involving many processing devices (e.g., GPUs, tensor processing units (TPUs), etc.). The training process 540 can implement any suitable training process, such as supervised learning, semi-supervised learning, self-supervised learning, or unsupervised learning, among others. Any suitable machine-learning model can be trained suing such techniques.

The machine-learning system 510 can include an evaluation process 545, which may be utilized to evaluate the progress or accuracy of the machine-learning model after training. Once evaluated, the machine-learning model may be deployed by a deployment process 550, for example, to one or more servers, edge devices, or other types of computing systems. The deployed model can be utilized in the field in an inference process 555, which may be utilized to collect and label additional data. The additional data may be manually or automatically annotated to create the labelled data 560, which may be passed to version control process 515 of the deep lake system 505 to update the data lake 160.

Various experimental data indicating the improved performance of the aforementioned techniques are described in connection with FIGS. 6, 7, 8, and 9. The experimental data demonstrates the performance of the present techniques at scale from the point of ingestion into the format up to training at scale against other dataloaders and formats. Different streaming datasets and different storage backends are compared to the present techniques, and performance gains and scalability are demonstrated while training on the cloud.

Figure 6:
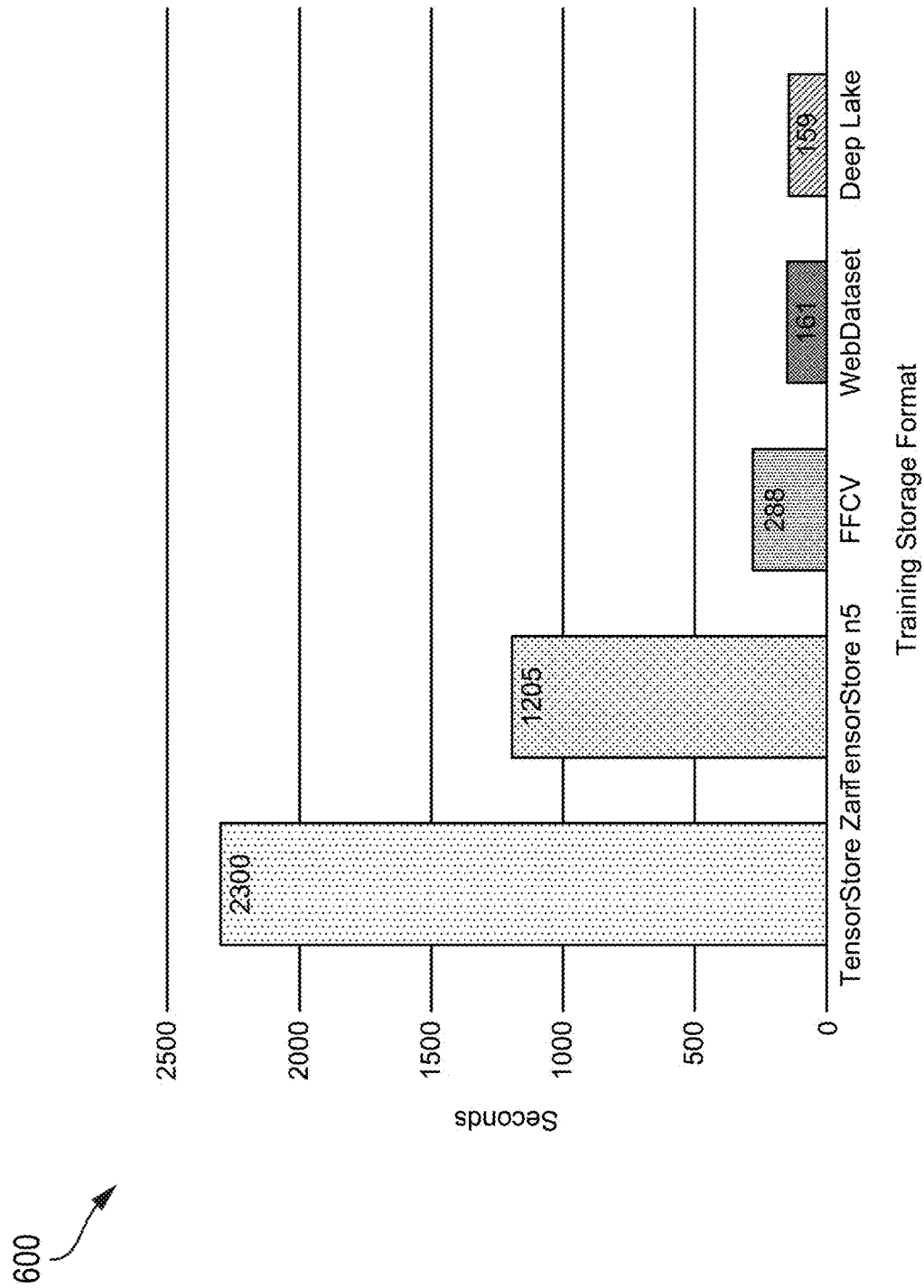
FIG. 6 illustrates a graph depicting example results from ingesting 10,000 images from an example dataset and converting the dataset into different format, in accordance with one or more implementations.

FIG. 6 illustrates a graph 600 depicting example results from ingesting 10,000 images from an example dataset and converting the dataset into different format, in accordance with one or more implementations. To generate the graph 600, 10,000 images from the Flickr-Faces-HQ (FFHQ) dataset were uncompressed and stored in NumPy format. Each 1024×1024×3 raw image is a 3 MB array. Then, as shown in the graph 600, images were serially written into each format. In this example experiment, performance, TensorStore was used to write to Zarr and N5 formats. The experiments were done on the AWS c5.9xlarge machine. The techniques described herein achieve significantly faster write performance compared to array formats and on par with binary formats such as WebDataset and FFCV Beton.

Figure 7:
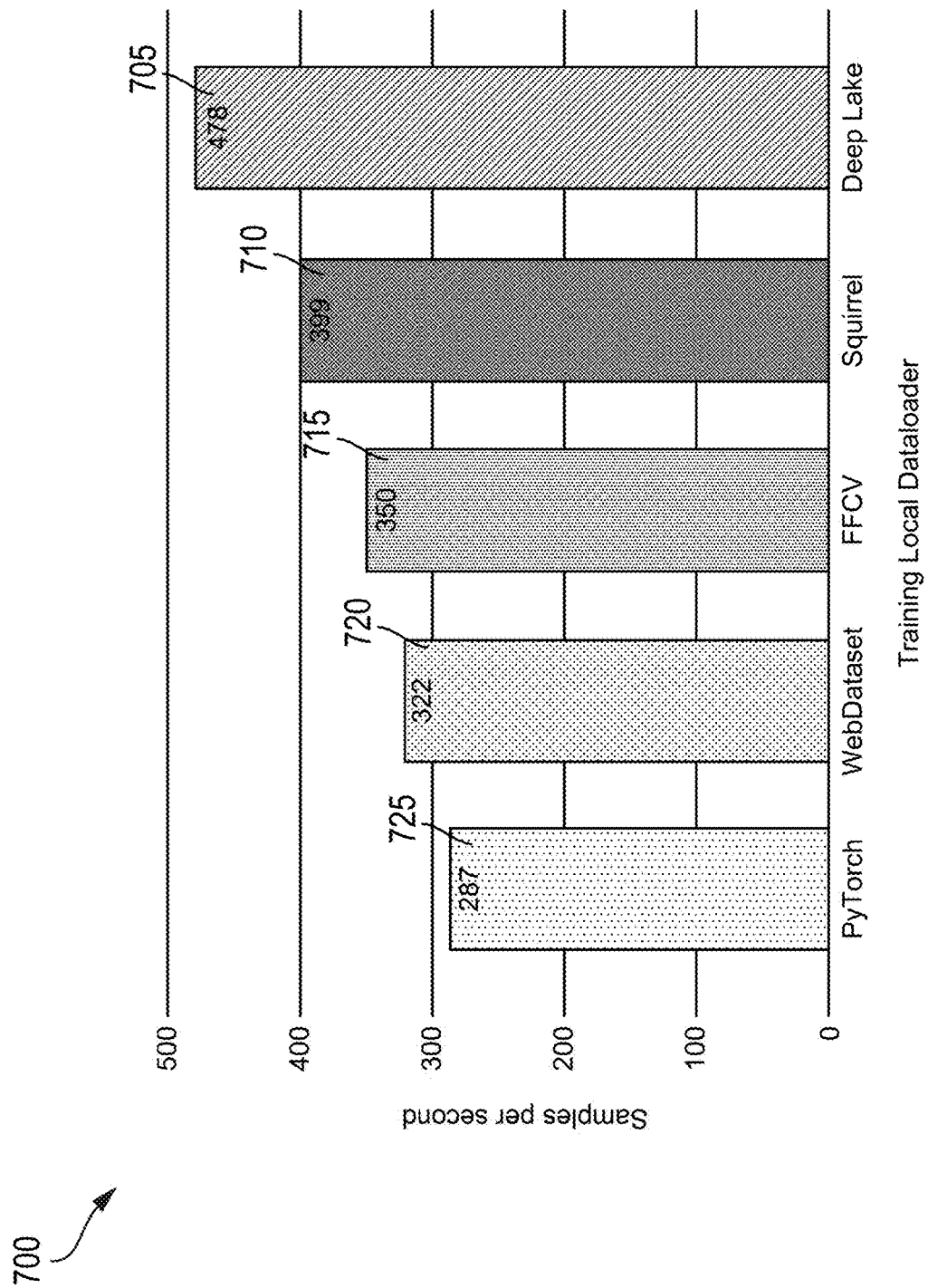
FIG. 7 illustrates a graph depicting a comparison of an example iteration speed of the present techniques are and other data loaders, in accordance with one or more implementations.

FIG. 7 illustrates a graph 700 depicting a comparison of an example iteration speed of the present techniques are and other data loaders, in accordance with one or more implementations. The present techniques outperform alternative approaches in local and remote settings, as seen in benchmarks for iterating on large images FIG. 7. The present techniques significantly outperform on larger images. As shown in FIG. 7, the present techniques achieve faster data loading in a PyTorch training loop without a model. The experiment was carried out on AWS P3.2xlarge instance with one Nvidia V100 GPU card. The dataset has randomly generated 50,000 250×250×3 images stored as JPEG files. The list of libraries in which the benchmarks were carried out was Deep Lake (the present techniques), FFCV, Squirrel, Web-dataset and native PyTorch dataloader.

Figure 8:
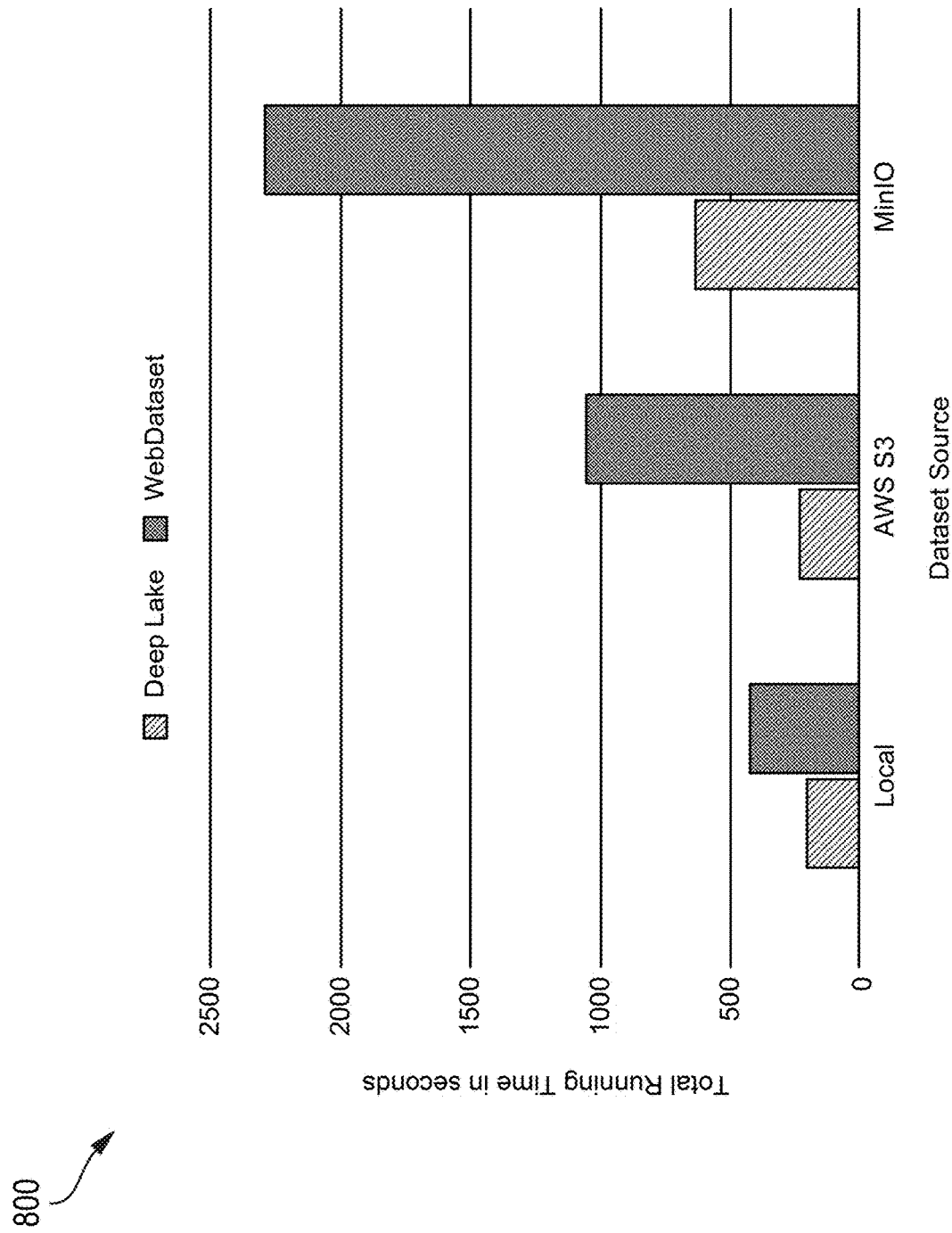
FIG. 8 illustrates a graph depicting example results from streaming data from different data storage locations, including a local file system, a cloud computing system (e.g., AWS S3), and MinIO, in accordance with one or more implementations.

FIG. 8 illustrates a graph 800 depicting example results from streaming data from different data storage locations, including a local file system, a cloud computing system (e.g., AWS S3), and MiniIO, in accordance with one or more implementations. In this experiment, different storage backends for remote streaming are compared using the same dataset as used for the experiment described in connection with FIG. 7. MinIO is running on another machine in a local network. Notably, the present techniques achieve similar performance as if the data is local to the machine compared to AWS S3.

Figure 9:
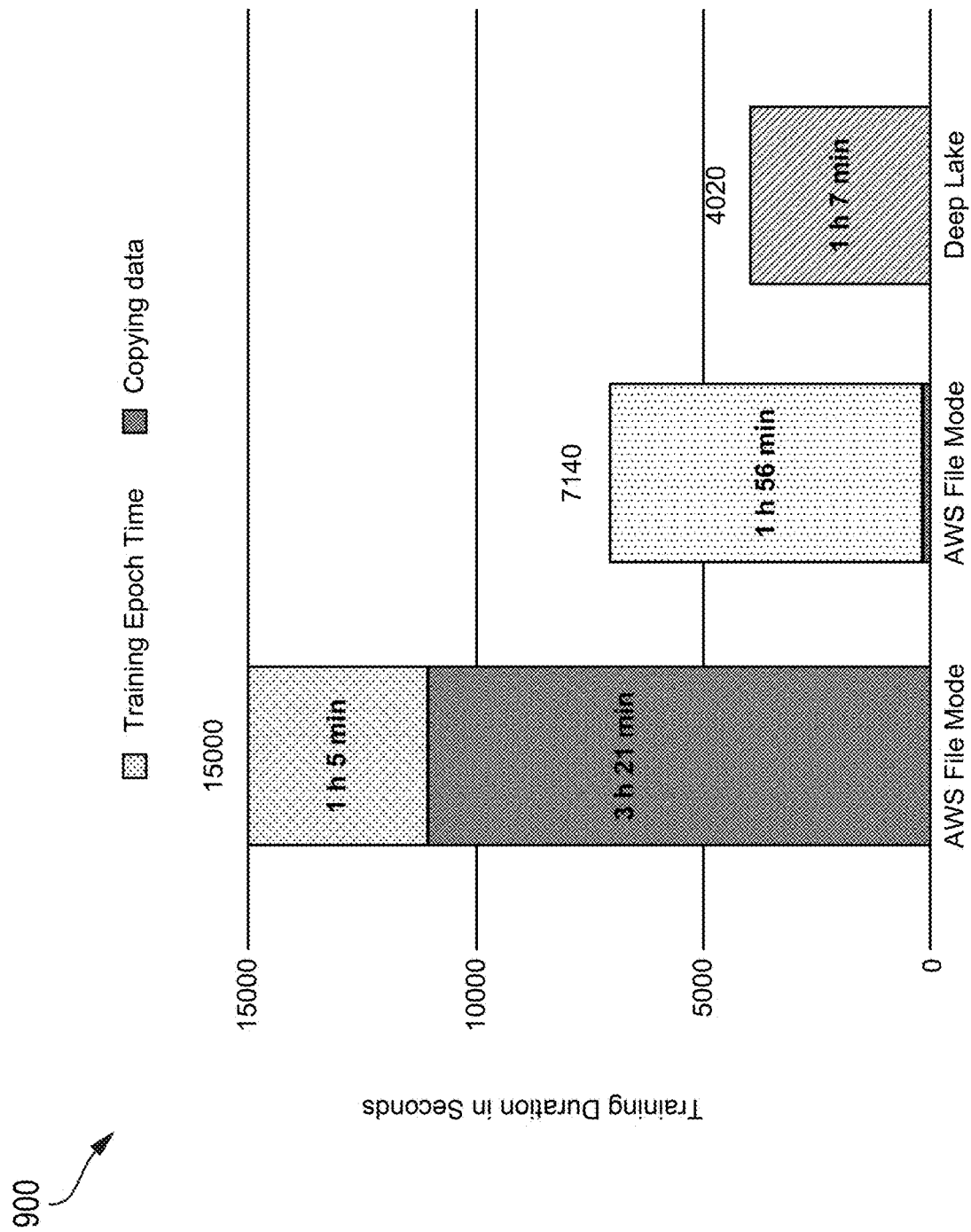
FIG. 9 illustrates a graph depicting a comparison of durations of training a machine-learning on ImageNet using the present techniques and other data management solutions, in accordance with one or more implementations.

FIG. 9 illustrates a graph depicting a comparison of durations of training a machine-learning model on ImageNet using the present techniques and other data management solutions, in accordance with one or more implementations. In this experiment, the ImageNet dataset was store on AWS S3 as original and in the format described in connection with FIG. 2. The dataset contains 1.2 million images and labels in total 150 GB. The data processing system 105, implementing the present techniques, achieves virtually similar training performance as if the data were local to the machine. This saves up to 4× GPU compute time and cost as shown in FIG. 9. AWS File Mode copies file by file from S3; Fast File Mode starts immediately with slower training; the present techniques perform as if data is local, although it is streamed (lower better).

Referring back to FIG. 1, and to the query processing functionality of the data processing system 105, the query identifier 115 can identify one or more queries for a multi-dimensional sample dataset (e.g., the data structure 200 stored in the data lake 160. The multi-dimensional sample dataset may include any number of samples 165, each of which may include a respective number of tensors. The multi-dimensional sample dataset can be stored in the data lake 160 in a format similar to the data structure 200 of FIG. 2. The query can include any number of nested queries or sub-queries, operations, commands, or Python/NumPy-style bracket or range notation. In some implementations, the query can specify one or more transformation operations, grouping operations, ungrouping operations, or sampling operations, as described in further detail in connection with FIGS. 11, 12, 13, 14, and 15.

The query identifier 115 can identify one or more queries by receiving the queries from a computing device, such as the client device 130 or from an application, script, or other process executing on the data processing system 104. For example, the client device 130 may include a script that implements one or more APIs of the query identifier 115 and which provides the query identifier 115 with an indication of a query string and a corresponding identifier of the multi-dimensional sample dataset for which the query is to be executed. In some implementations, the client device 130 or the data processing system 105 can provide the query to the query identifier via a graphical user interface, such as the graphical user interface 1000 described in connection with FIG. 10.

Tensor queries can include both SQL keywords additional keywords that enable tensor-specific and dataset-specific functionality. For example, tensor queries can include range-based requests, which involve tensor slicing or indexing using Python or NumPy square bracket notation, for example. Range-based requests may be utilized to implement cropping functionality. Additionally processing keywords, such as normalization functions, mean, median, or mode functions, and addition/sum functions, among others, can be implemented as part of tensor queries, and may themselves operate on specified ranges or slices of tensors 170 in the multi-dimensional sample dataset. The queries can utilize additional square bracket notation to query multi-dimensional tensors 170. Queries can additionally include comparison operations for tensors 170 (or slices/indices of tensors), as well as tensor-based sums, multiplication operations, subtraction operations, division operations, or other mathematical operations. An example query, with range-based requests, cropping functionality, a normalization operation, and a user-defined function, is provided below:

SELECT
   images[100:500, 100:500, 0:2] as crop,
   NORMALIZE(
   boxes,
   [100, 100, 400, 400]) as box
FROM dataset
WHERE IOU(boxes, "training/boxes")>0.95
ORDER BY IOU(boxes, "training/boxes")
ARRANGE BY labels In the above example query, an example multi-dimensional sample dataset "dataset" is queried using TQL, which may include SQL keywords and additional keywords that enable additional processing operations or tensor-specific operations. In this example, the dataset includes a number of samples 165, each of which include an "images" tensor 170, a "boxes" tensor 170, and a "labels" tensor 170. The query selects cropped versions of the "images" tensor 170, and normalized data from the "boxes" tensors 170 within the cropped regions from the samples of the "dataset" multi-dimensional sample dataset that satisfy the "WHERE" clauses in the query. In this example, the "WHERE" clause of the query includes a user-defined "IOU" function, which performs an Intersection over Union machine-learning operation to return a metric used to measure the accuracy of the bounding boxes on the dataset.

In this example, only samples where the accuracy of the bounding boxes (here, stored in the "boxes" tensor 170) is greater than 0.95, as indicated by the greater than ">" condition in the "WHERE" clause of the query. Similar inequalities, such as less than "<" or not equal to "!=" may also be implemented as conditions of the tensor queries. The "ORDER BY" keyword causes the results of the query to be sorted according to the expression that follows, which in this case the same IOU function used in the "WHERE" clause, causing the results to be sorted, or ordered, by the respective accuracy metric of each sample that satisfies the where clause. Note that because the data being selected only includes data from the "images" and the "boxes" tensors 170, only that data will be returned as part of the query results, and not the accuracy metric resulting from the "IOU" or the "labels" tensor 170.

Upon identifying the query, the query identifier 115 can store the query in one or more data structures in the data lake, for example, in association with the dataset to which the query corresponds. In some implementations, the query may be stored in association with a user profile used to access the multi-dimensional sample dataset for which the query was provided. The query identifier 115 may, in some implementations, cache both queries and the results of said queries (managed by the data provider 125 as described herein). For example, upon generating the set of query results for a particular query, the query identifier 115 may store the query results in association with the query in a historic query database, query storage, or query library. The cached query results can be utilized to rapidly retrieve the correct results, for example in response to the same query being provided at a second, later time. In such implementations, the query identifier 115 can compare an identified query (e.g., a query received from a client device 130, via an API call, via user input at a graphical user interface, etc.) to the historic queries. If there is a match between the identified query and a historic query, and the data in the cached set of query results corresponding to the historic query has not been updated, the query identifier 115 can retrieve and provide the cached query results, significantly reducing computational resources.

In some implementations, the query identifier 115 may execute on the client device 130 as an embedded query engine, and may be utilized either while training a model on a remote compute instance or in-browser compiled over WebAssembly. As shown above in the example query, TQL extends SQL with numeric computations, and may additionally implement transformation functionality, such as normalization functions, cropping functions, or other types of transformations or machine-learning operations that may be returned as query results. Once a query has been identified by the query identifier 115, the query string can be passed to the query parser 117, which is responsible for parsing the query to extract identifiers of the dataset, tensors 170 in the dataset, keywords, and user-defined functions, among other operations.

The query parser 117 can receive the query string identified by the query identifier 115 and parse the query. The query parser 117 can perform a syntax checking operation to determine whether the syntax of the query is correct. For example, the query parser 117 can extract one or more string tokens from the query string in order, and iterate over each string token and apply one or more tensor query syntax checking rules to determine whether the provided query is syntactically correct. If a syntax error is detected in the query, the query parser 117 can generate an error message with an error identifier that identifies the error. The error identifier may be stored in association with the query, and the error message may be provided for display at the client device 130 or via a display device of the data processing system 105. In some implementations, the error message can include an indication of the location in query (e.g., the string token) where the error occurs, and may include an indication of the type of syntax error, or suggest a change to the query to make the query syntactically correct.

If the query is determined to be syntactically correct, the query parser 117 can further determine whether the query is semantically correct. Semantic correctness refers to whether the syntactically correct query is retrieving valid data or performing valid operations on valid data. For example, the query parser 117 can determine whether the tensors 170, the dataset, or the samples 165 upon which the query is being performed are valid, and whether the particular ranges, indices, or dimensions of the tensor 170 comport with what is provided in the query. If a semantic error is detected in the query, the query parser 117 can generate an error message with an error identifier that identifies the error. The error identifier may be stored in association with the query, and the error message may be provided for display at the client device 130 or via a display device of the data processing system 105. In some implementations, the error message can include an indication of the location in query (e.g., the string token) where the error occurs, and may include an indication of the type of semantic error, or suggest a change to the query to make the query semantically correct.

If the query is determined to be both syntactically and semantically correct, the query parser 117 can process the query to extract the query operations indicated in the query. As described herein, tensor-based queries can include a number of different operations, conditions, or clauses. In some implementations, the queries may include nested queries or sub-queries, which may also be evaluated by the query parser 117 using the aforementioned techniques. The query parser 117 may determine, for example, the particular multi-dimensional sample dataset for which the query was provided. The query parser 117 can identify the dataset by extracting the "FROM" keyword, which may precede an identifier of a dataset upon which the query is to be executed. In some implementations, the query identifier 115 and/or the query parser 117 can identify the dataset for which the query is provided without using the "FROM" keyword, for example, by receiving an identifier of the dataset with the query string as part of an API call, or from an application executing on the client device 130 or the data processing system 105. In some implementations, the identified dataset can be a specified version of the dataset (e.g., specified as part of the query, specified separately from the query, etc.).

The query parser 117 can parse and extract all of the operations, clauses, tensors 170, samples 165, keywords, conditions, or other relevant data, such that a computational graph can be generated for the query and the query can be executed accordingly. Some example operations that may be included in tensor queries are as follows. Tensor queries can include a "CONTAINS" or "==" keywords or conditions, which can evaluate whether a particular tensor 170 is equal to a particular value. Two example queries including these keywords are provided below.

select*where tensor_name==numeric_value select*where contains(tensor_name,'text_value')

The first query selects all samples 165 within a corresponding dataset where the "tensor_name" tensor 170 is equal to the right-hand "numeric_value," which is a placeholder that may be replaced with a numeric_value or an expression that evaluates to a numeric_value. The second query selects all samples 165 within a corresponding dataset where the "tensor_name" tensor 170 is equal to the right-hand "text_value," string, which is a placeholder that may be replaced with a text string or an expression that evaluates to a text string. The "==" and "CONTAINS" are a condition that requires an exact match, and may be used when the tensor 170 evaluated in the condition has just one value (e.g., no lists or multi-dimensional arrays). Square brackets notation can be used to index a single value of a multi-dimensional tensor 170 for these operations.

Tensor queries can include a "SHAPE" function, which returns a value indicating the size of each dimension in the tensor 170. The value returned by the "SHAPE" function can be an array that has a number of elements equal to the rank of the tensor 170 (e.g., the number of dimensions of the tensor 170). Each value in the array can be equal to the size of the dimension corresponding to the respective rank index. An example query showing this functionality is included below.

select*where shape(tensor_name)[1]>numeric_value

In the query above, all tensors of each sample 165 in a corresponding dataset where the size of the second dimension of the "tensor_name" tensor 170 is greater than "numeric_value," which is a placeholder that can be replaced with any suitable numeric_value, are returned. Similarly, the "1" index can be replaced with any valid index, with the first dimension of the tensor 170 being assigned the "0" index, the second dimension of the tensor 170 being assigned the "1" index, and so on.

Tensor queries can include a "LIMIT" clause, which limits the number of results returned from the query. The particular results selected may be the first results retrieved as a result of the query. An example query showing this functionality is included below.

select*where contains(tensor_name,'text_value')limit
        num_samples

In the query above, all tensors 170 of each sample 165 where the "tensor_name" tensor 170 is equal to "text_value," which is a placeholder that can be replaced with any suitable text string, are returned, but limited to "num_samples" results. In this example, "num_samples" is a placeholder that can be any suitable numeric_value, or any expression that evaluates to a valid numeric_value.

Tensor queries can include "AND," "OR," and "NOT" expressions. The "AND" expression returns samples 165 that satisfy a left-hand condition and a right-hand condition. The "OR" expression returns samples 165 that satisfy a left-hand condition or a right-hand condition. The "NOT" expression may be combined with the "AND" or "OR" expressions, or may be used individually, and returns samples 165 that do not satisfy a right-hand condition. Example tensor queries showing these functionalities are included below:

select*where contains(tensor_name,'text_value') and
        NOT contains(tensor_name_2,numeric_value)

select*where contains(tensor_name,'text_value') or
        tensor_name_2==numeric_value In the first query above, all tensors 170 of each sample 165 where the "tensor_name" tensor 170 is equal to "text_value," and where the "tensor_name_2" tensor 170 is not equal to "numeric_value," are returned. In this example, "text_value" and "numeric_value" are placeholders that can be replaced with any suitable text string or numerical value, respectively. In the second query above, all tensors 170 of each sample 165 where the "tensor_name" tensor 170 is equal to "text_value," or where the "tensor_name_2" tensor 170 is equal to "numeric_value," are returned as query results, as described herein.

Tensor queries can include "UNION" and "INTERSECT" operations. A "UNION" expression returns all unique elements resulting from a combination of two sets (e.g., which may be returned by respective "SELECT" operations), and an "INTERSECT" expression returns all unique elements that are common to two sets (e.g., which may be returned by respective "SELECT" operations). Example tensor queries showing these functionalities are included below:

(select*where contains(tensor_name,'value'))intersect
        (select where contains(tensor_name_2,
        'value_2'))

(select*where contains(tensor_name,'value'))union
        (select where tensor_name_2==value_2)

In the first query above, all tensors 170 of each unique sample 165 included in a first set of samples 165 where the "tensor_name" tensor 170 is equal to "value," and included in a second set of samples 165 where the "tensor_name_2" tensor 170 is equal to "value_2," are returned. In this example, "value" and "value_2" are placeholders that can be replaced with any suitable text string. In the second query above, all tensors 170 of each unique sample 165 included in a first set of samples 165 where the "tensor_name" tensor 170 is equal to "value," or included in a second set of samples 165 where the "tensor_name_2" tensor 170 is equal to "value_2," are returned. Parentheses can be utilized to establish a desired order of the operations specified in the tensor queries, as shown above.

Tensor queries can include an "ORDER BY" operation. An "ORDER BY" operation can sort results of a query (or sub-query) according to a value of a designated tensor 170. The "ORDER BY" operation can operate on tensors 170 (or indices of tensors 170 accessed via square brackets) that are numeric and have one value. In some implementations, the "ORDER BY" operation can operate on tensors 170 including string data, and can sort ascending or descending according to a text sorting rule (e.g., alphabetical order, capital letters first, etc.). The "ORDER BY" operation can be designated as a descending (e.g., greatest value first, descending) or an ascending (e.g., smallest value first, ascending) operation. An example tensor 170 query showing these functionalities are included below:

select*where contains(tensor_name,'text_value')order
        by tensor_value asc In the query above, all tensors 170 of each sample 165 where the "tensor_name" tensor 170 is equal to "text_value," are returned. Additionally, these returned values are sorted, ascending (with smallest value first, moving to greatest value last), according to the value of the "tensor_value" tensor 170 of the samples 165. The "asc" keyword in the "ORDER BY" operation indicates that the results of the "ORDER BY" should be sorted as ascending. A "desc" keyword may be utilized to indicate that the results of the "ORDER BY" should be sorted as descending.

Tensor queries can include "GROUP BY" and "UNGROUP BY" operations. A "GROUP BY" operation returns groups of samples according to the values of a specified tensor 170. Each sample 165 that has the same value for the specified tensor 170 is returned as part of the same group. Ungroup by is the inverse, and breaks up groups of samples 165 that are grouped according to a specified tensor. An example tensor query showing these functionalities is included below:

select*where contains(tensor_name,'text_value')
  group by tensor_label

In the query above, all tensors 170 of each sample 165 where the "tensor_name" tensor 170 is equal to "text_value," are returned. Additionally, the returned samples are grouped according to the value of the "tensor_label" tensor 170 of each of the returned samples 165. The set of query results can include pointers to each group, or respective arrays for each group that includes indices of each sample 165 (or the tensors 170 corresponding thereto) included in each group. In some implementations, the group by functionality can be utilized to group a sequence of image frames into a single video sample. Likewise, ungroup functionality can enable breaking up a video into a sequence of samples, where each sample includes an image tensor corresponding to a respective frame in the video. Videos can be grouped or ungrouped according to specified criteria, such as the number of frames that should be included in each group or sample, the tensors from the video to include each group or sample, or other criteria as described herein.

Tensor queries can include "ANY," "ALL," and "ALL_STRICT" operations. The "ANY" operation returns a sample 165 if a specified condition involving any element of a dimension of a specified tensor 170, or the specified tensor itself if the tensor 170 is an array, evaluates to "True." The "ALL" operation returns a sample 165 if a specified condition involving all elements of a dimension of a specified tensor 170, or the specified tensor itself if the tensor 170 is an array, evaluates to "True," and also returns true if the expression evaluates to an empty value. The "ALL_STRICT" operation returns a sample 165 if a specified condition involving all elements of a dimension of a specified tensor 170, or the specified tensor itself if the tensor 170 is an array, evaluates to "True," but returns false if the expression evaluates to an empty value. Example tensor queries showing these functionalities are included below:

select*where all_strict(tensor_name[:,2]>numeric_value)

select*where any(tensor_name[0:6]>numeric_value)

The first query returns all tensors 170 of each sample 165 that includes a "tensor_name" tensor 170 where each value in the third column of the "tensor_name" tensor 170 is greater than "numeric_value," which is a placeholder for any numerical value or expression that evaluates to a numeric_value. The first query returns all tensors 170 of each sample 165 that includes a "tensor_name" tensor 170 where any value in the range of indices "0" to "6" of the "tensor_name" tensor 170 array is greater than "numeric_value," which is a placeholder for any numerical value or expression that evaluates to a numeric_value.

Tensor queries can include "LOGICAL_AND" and "LOGICAL_OR" operations. The "LOGICAL_AND" and "LOGICAL_OR" can be used to specify Boolean AND or Boolean OR conditions that can be evaluated in "WHERE" clauses. These logical operations can be utilized to compare multiple conditions with tensors 170 from the same sample 165. An example tensor query showing these functionalities is included below:

select where any(logical_and(tensor_name_1[:,3]
  >numeric_value, tensor_name_2=='text_value'))

In the query above, all tensors 170 of each sample 165 where the fourth column of the "tensor_name_1" tensor 170 is greater than "numeric_value," and the "tensor_name_2" tensor is equal to "text_value," are returned. Were the above query a "LOGICAL_OR" query instead of a "LOGICAL_AND" query, each sample 165 where the fourth column of the "tensor_name_1" tensor 170 is greater than "numeric_value," or the "tensor_name_2" tensor is equal to "text_value," are returned as the query results.

Tensor queries can include "SAMPLE BY" operations. Sampling is can be used when training models in order to modify the distribution of data that models are trained on. One sampling objective is to rebalance the data in order to achieve a more uniform distribution of classes in the training loop. The "SAMPLE BY" operations in tensor queries can implement these features. The "SAMPLE BY" operations can enable a user to specify a distribution of samples having tensors that satisfy certain conditions. An example tensor query showing these functionalities is included below:

select sample by weight_choice(expression_1:
  weight_1,expression_2: weight_2, . . . )replace
  True limit N In the above query, multiple expressions (e.g., "expression_1," "expression_2," etc.) are assigned corresponding weight values (e.g., "weight_1," "weight_2", etc.). The samples 165 in the multi-dimensional sample dataset can be assigned the weight that corresponds to whatever expression resolves to true for that sample. The "weight_choice" resolves the weight that is used when multiple expressions evaluate to True for a given sample 165. Options include "max_weight" and "sum_weight." For example, if weight_choice is max_weight, then the maximum weight will be chosen for that sample. The "replace" keyword determines whether samples should be drawn from the multi-dimensional sample dataset with replacement. The default value may be True. The "limit" keyword specifies the number of samples 165 that should be returned. If unspecified, the number of samples corresponding to the length of the dataset may be returned. The weight value for a sample 165 specifies the relative likelihood that the particular sample 165 will be selected in a pseudo-random selection process. As such, the "SAMPLE BY" operation can be used to generate a dataset that favors samples 165 with certain characteristics (e.g., certain tensor 170 values, etc.).

The query parser 117 can parse and resolve each of the expressions, keywords, tensor names, and operations described herein. In the example queries, the tensor names can be the name of the tensor 170 assigned as part of the metadata corresponding to that tensor 170 (e.g., indicated as a column header in the data structure 200 of FIG. 2). The query parser 117 can access the metadata of the multi-dimensional sample dataset to identify the tensor name of each tensor 170 in the multi-dimensional sample dataset when parsing the queries. The query parser 117 can extract each keyword, tensor name, expression, and operation from the query string, and generate corresponding computational tasks that can be executed to perform the query on the corresponding dataset. The computational tasks can be provided to the query executor 120 for execution.

In some implementations, the query parser 117 can generate a computational graph indicating how the tensor query should be executed. For example, the query parser 117 can include a planner that may optionally delegate computation to external tensor computation frameworks. The query plan generates a computational graph of tensor operations. Each node in the computational graph may specify one or more tensor operations, and edges in the computational graph can indicate the inputs and outputs of each tensor operation. For example, the input data for a first node may be raw tensor 170 data retrieved from the data lake 160, and the output of the first node (e.g., produced from the tensor operations being executed on the raw tensor 170 data) may be provided to a second node as input for a second set of tensor operations. In this example, the first node may have a directed edge toward the second node, indicating that the output data of the first node should be provided as input to the second node. Nodes in the computational graph may have multiple input and output edges, and may ultimately produce one or more sets of final query results, as described herein.

The query executor 120 can execute the query graph by traversing each node of the query graph and performing the computational tasks of that node. Execution of the query can be delegated to external tensor computation frameworks such as PyTorch or XLA and efficiently utilize underlying accelerated hardware. For example, nodes of the graph with computational tasks that are better suited for a particular framework can be assigned and executed using that framework. In some implementations, nodes of the graph with computational tasks that are better suited for a particular computer hardware (e.g., GPUs, field programmable gate arrays (FPGAs), TPUs, etc.) can be assigned to, communicated to, and executed by computing systems having said computer hardware.

Although the aforementioned query examples include a variety of query operations, it should be understood that those operations are not exhaustive, and that the query parser 117 can parse and generate computational tasks for a variety of multi-dimensional processing functions. For example, the tensor queries can include multidimensional array operations such as computing the mean, median, or mode of multidimensional arrays or projecting arrays on a specific dimension. Tensor queries can specify a shuffle operation, and which indicates that the results of the query, when returned, should be randomly ordered based on the shuffle operation. The shuffle operation may specify a random shuffling algorithm, or a default shuffling algorithm may be used. In some implementations, tensor queries may include one or more keywords that specify a requested shape for tensors 170 in returned in the query results. For example, the data processing system 105 can transform the tensors 170 (or data extracted therefrom) to generate data for the query results, and the results of the query can include a set of identifiers of the transformed tensors 170 having the requested shape. It should be understood that, in addition to the examples that have been provided, tensor queries may include several sub-queries of varying complexity. The query parser 117 can iterate through and generate computational tasks for all sub-queries in a tensor query to ultimately generate a set of query results, as described herein.

The query executor 120 can execute the parsed query to generate a set of query results. To do so, the query executor 120 can iterate through each of the query operations enumerated by the query parser 117, and generate one or more functors corresponding to the query operations. Functors, or function objects, include processor-executable instructions that, when executed, cause the query executor 120 to carry out the operations indicated in the query. Functors are constructs allowing an object to be invoked. The functors may be generated based on templates, which can be populated with pointers, references, or other identifiers of the data to be processed, as well as any numerical constants, conditions, or text data specified in the query. In one example, if a query (e.g., any of the operations described herein, etc.) identifies a particular tensor 170 in a multi-dimensional sample dataset, the query executor 120 can generate a functor that, when executed, causes the tensor 170 identified in the query to be retrieved. In some implementations, if a range of values of the tensor 170 (e.g., over one or more dimensions) or a single indexed value of the tensor 170 is identified in the query, the query executor 120 can generate a functor that, when executed, causes the identified portion of the tensor 170 to be retrieved. The retrieval process can be repeated for each sample 165 having the identified tensor 170 in the multi-dimensional sample dataset. Because the tensor data can be stored in chunks or columns, the query executor 120 can implement chunk-based retrieval and caching to improve performance.

The query executor 120 can generate functors that implement the operations specified in the tensor query. For example, for a comparison operation, the query executor 120 can generate one or more functors that, when executed, cause the identified tensor 170 (or a portion thereof) to be compared with a corresponding numerical or text_value (or numerical value or text value resolved from one or more expressions, which may also implicate other tensors 170). For a shape operation, the query executor 120 can generate one or more functors that, when executed, cause the identified tensor 170 to be processed according to the shape function (e.g., to return a scalar if an array, or an array of values if a multi-dimensional tensor 170, etc.).

For a limit operation, the query executor 120 can generate one or more functors that, when executed, reduces the number of results in the set of query results generated by the query executor 170 to the query-specified number. For AND, OR, and NOT expressions, the query executor 120 can generate one or more functors that, when executed, cause the identified tensor 170 to evaluate the retrieved tensors according to the query-specified expression. For UNION and INTERSECT operations, the query executor 120 can generate one or more functors that, when executed, produces the set of query results according to the respective sets of results generated from the corresponding sub-queries and the INTERSECT or UNION operation. Similar functors can be generated by the query executor 120 for ORDER BY, GROUP BY, SAMPLE BY, ANY, ALL, ALL_STRICT, LOGICAL_AND, and LOGICAL_OR operations, among other operations that may be included in the tensor query. In some implementations, the templates selected for each tensor operation functor may be selected based on a suitable library, API, or computational framework that is best suited for the tensor operation. In some implementations, the templates selected for one or more tensor operation functors may be selected based on the computer hardware best suited for the one or more tensor operation functors.

The output of the final tensor operation functors executed by the query executor 120 can a set of query results. The particular tensors 170 of the samples 165 identified based on the query may be specified using the "SELECT" keyword. If a range of values, or an index of a value, in the tensors to be returned is specified in the query, the query executor can extract the particular ranges or indices along the requested dimensions of the tensors to produce the set of query results. In some implementations, the query executor 120 can store the retrieved tensors 170 (or data, dimensions, transformed tensors, or other tensors, arrays, or scalars generated or extracted therefrom) in the memory of the data processing system 105 or in the data lake 160 as a query result dataset. The data may be stored, for example, in a format similar to that described in connection with FIG. 2, or in any other suitable format. The query executor 120 may perform a materialization process on the data corresponding to the set of query results.

In some implementations, the query executor 120 can generate a set of indices that point to locations of each tensor 170 returned from executing the query as the set of query results. For example, once the query results have been retrieved, a corresponding set of pointer values, references, or indices can be generated that identify the data of each result in the set of query results. The set of indices may be an array if the results are one-dimensional, or may be a multi-dimensional data structure (e.g., a matrix, a tensor, etc.) if the set of query results return more than one type of tensor 170 for each sample 165. In some implementations, the set of query results can be an array of indices that point to locations of samples 165 in the data lake 160 that satisfy the conditions in the query. In some implementations, the query executor 120 can format or transform the query result tensors 170, to conform to a particular shape or dimensionality specified in the query. Once generated, the set of query results can then be accessed by the data provider 125 to provide the set of query results as output.

The data provider 125 can provide the set of query results as output. The set of query results may be provided, for example, by the data provider 125 to a machine-learning system or process, such as those described in connection with FIGS. 3 and 5. In some implementations, the data provider 125 can provide the set of query results to the client device 130 (e.g., in a case where the client device 130 provided the query, and the data processing system 105 executed the query). In some implementations, the data provider 125 can provide the set of query results as indices that point to the tensor 170 data returned (or processed) from the query. Using the indices, the tensor 170 data corresponding to the query results can be retrieved from computer memory or from the data lake 160 (e.g., if the data was stored as a separate dataset, for example). The data provider 125 may provide the set of query results for display to a visualization process, such that the results of the query (e.g., the tensors 170 of each sample 165 returned from the query) can be observed in a graphical user interface. The visualization process may be provided by the data processing system 105, or may be implemented by the client device 130.

The data provider 125 may store the set of query results in one or more data structures in the memory of the data processing system 105 or the client device 130. The set of query results, or indices corresponding thereto, may be stored in association with the query from which the query results were generated. The set of query results may be cached and utilized in future queries or query operations, as described herein. The set of query results may be stored in a historic query database, for example, in association with the multi-dimensional sample dataset to which the query corresponds (e.g., if the dataset has write permissions for the user profile used to execute the query), or in the user profile used to execute the query. The data provider 125 may receive requests to execute historic queries, and may provide the historic queries (and indications of any cached query results corresponding thereto) to the query identifier 115.

Although the foregoing descriptions of the query processing operations have been described herein as being performed by the data processing system 105, it should be understood that one or more of the operations of the data processing system 105 may instead be performed by the client device 130, or vice versa. For example, the client device 130 may retrieve tensors 170 from the data lake 160 according to the query, execute the query on the retrieved datasets, and provide the set of query results as output, as described herein. Likewise, in some implementations, different querying operations may be performed by the data processing system 105 and the client device 105, with the set of query results being resolved via communications between the data processing system 105 and the client device 130.

Figure 11:
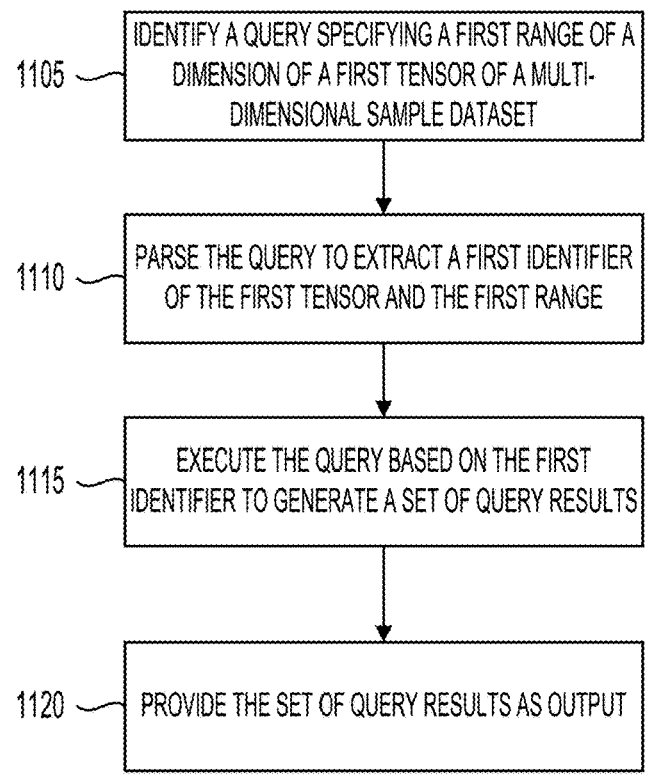
FIG. 11 illustrates a flow diagram of an example method of identifying and executing a tensor query based on specified a range for a tensor of a multi-dimensional sample dataset, in accordance with one or more implementations.

FIG. 11 illustrates a flow diagram of an example method 1100 of identifying and executing a tensor query based on a specified range for a tensor (e.g., a tensor 170) of a multi-dimensional sample dataset (e.g., one or more sets of the samples 165, the data structure 200 of FIG. 2), in accordance with one or more implementations. The method 1100 may be performed, for example, by the data processing system 105, the client device 130, or any other computing system described herein.

Although the method 1100 is described as being performed by the data processing system 105, it should nevertheless be understood that any computing device may perform the various operations of the method 1100, and communicate any results of the operations or intermediate computations relating to the operations to any other computing device described. The method 1100 is described as having steps 1105-1120, however, it should be understood that the steps (referred to as ACTs) may be performed in any order, and that steps may be omitted or additional steps may performed to achieve useful results.

At ACT 1105, the data processing system (e.g., the data processing system 105) can identify a query specifying a first range of a dimension of a first tensor (e.g. a tensor 170 of a set of samples 165) of a multi-dimensional sample dataset (e.g., the set of the samples 165, the data structure 200, etc.). To do so, the data processing system can perform the operations of the query identifier 115 described in connection with FIG. 1. Each tensor (e.g., of the one or more tensors 170 of the multi-dimensional sample dataset) can have a respective identifier (e.g., the tensor name or metadata as described herein) that is common to each sample of the multi-dimensional sample dataset (e.g., as shown in each column of the data structure 200 of FIG. 2). Each tensor may include one or more values or one or more dimensions. The query can specify a first identifier (e.g., a tensor name, other tensor metadata) of a first tensor of the multi-dimensional sample dataset.

The first range or the first dimension of the tensor can be specified in the query as a square bracket notation range notation, as described herein. The range may specify a range of elements among one or more dimensions of the tensor to retrieve as the query results or process as part of determine which tensors to return as the set of query results, as described herein. In some implementations, the query can specify a requested shape for the data identified by the set of indices of the set of query results. The data processing system can generate data for the query results, and the results of the query can include a set of identifiers of the transformed tensors having the requested shape, as described herein. As described herein, the queries can specify one or more tensors, dimensions, ranges, tensors, operations (e.g., mathematical operations, shuffle operations, sampling operations, grouping operations, set-based operations, logical operations, transformation operations, etc.), or conditions. The data processing system can identify the query from an API call, via one or more messages received from a client device (e.g., the client device 130), via user input, from a script or file, or another data source or source of queries. After identifying the query, the data processing system can parse the query as described herein.

At ACT 1110, the data processing system can parse the query to extract a first identifier of the first tensor and the first range of the first dimension. To do so, the data processing system can perform the operations of the query parser 117 described in connection with FIG. 1. For example, the data processing system can perform a syntax check on the identified query string, by applying one or more tensor query syntax checking rules to determine whether the provided query is syntactically correct. The data processing system can perform a semantic check on the identified query string, by applying one or more tensor query semantic checking rules and metadata checking rules to determine whether the provided query is semantically correct. If a syntax error or semantic error is detected in the query, the data processing system can generate an error message with an error identifier that identifies the error. The error identifier may be stored in association with the query, and the error message may be provided for display at the client device or via a display device of the data processing system.

If the query is determined to be both syntactically and semantically correct, the data processing system can process the query to extract the query operations indicated in the query. As described herein, tensor-based queries can include a number of different operations, conditions, or clauses. In some implementations, the queries may include nested queries or sub-queries, which may also be evaluated by the data processing system using the aforementioned techniques. The data processing system may determine, for example, the particular multi-dimensional sample dataset for which the query was provided. The data processing system can identify the dataset by extracting the "FROM" keyword, which may precede an identifier of a dataset upon which the query is to be executed. In some implementations, the data processing system can identify the dataset for which the query is provided without using the "FROM" keyword, for example, by receiving an identifier of the dataset with the query string as part of an API call, or from an application executing on the client device or the data processing system. In some implementations, the identified dataset can be a specified version of the dataset (e.g., specified as part of the query, specified separately from the query, etc.).

The data processing system can parse and extract all of the operations, clauses, tensors, samples, keywords, conditions, or other relevant data, such that tensor computational operations can be generated for the query and the query can be executed accordingly. For example, the data processing system can identify ranges and dimensions of requested tensors in the query. The range may be a range of indices of one or more dimensions of a tensor. The range can be utilized to specify a portion of a tensor to return as query results, or to process in order to identify the samples or tensors that should be returned as query results. The range may be specified using Python or NumPy square bracket notation, where the brackets are appended to the name of the tensor (e.g., the identifier of the tensor) on which the range is being applied. The range of the tensor may enable tensor queries to perform operations on, or only evaluate conditions or expressions on, portions of tensors, rather than the entirety of a tensor. This is beneficial for machine-learning operations that may utilize or evaluate portions of data, rather than the entirety of data. In some implementations, ranges can identify the entirety of one or more dimensions of a tensor. Similar notation may be utilized to define shapes of tensors that should be returned as part of the query results. The data processing system can extract the range notation for each tensor for which ranges are specified.

At ACT 1115, the data processing system can execute the query based on the first identifier to generate a set of query results. To do so, the data processing system can perform the operations of the query executor 120 described in connection with FIG. 1. The set of query results may include a set of indices identifying data corresponding to the first range of the first tensor of each sample of a subset of samples of the multi-dimensional sample dataset identified or retrieved based on the query. To execute a query including a range-based request, the data processing system can iterate through each of the query operations extracted from the query, and generate one or more functors corresponding to the query operations.

Functors, or function objects, include processor-executable instructions that, when executed, cause the data processing system to carry out the operations indicated in the query. The functors may be generated based on templates, which can be populated with pointers, references, or other identifiers of the data to be processed, as well as any numerical constants, conditions, or text data specified in the query. In one example, if the query (e.g., any of the operations described herein, etc.) identifies a particular tensor in a multi-dimensional sample dataset, the data processing system can generate a functor that, when executed, causes the tensor identified in the query to be retrieved. In some implementations, if a range of values of the tensor (e.g., over one or more dimensions) or a single indexed value of the tensor is identified in the query, the data processing system can generate a functor that, when executed, causes the identified portion of the tensor to be retrieved. The retrieval process can be repeated for each sample having the identified tensor in the multi-dimensional sample dataset. Because the tensor data can be stored in chunks or columns, the data processing system can implement chunk-based retrieval and caching to improve performance.

The data processing system can generate functors that implement the operations specified in the tensor query. For a shape operation, the data processing system can generate one or more functors that, when executed, cause the identified tensor to be processed according to the shape function (e.g., to return a scalar if an array, or an array of values if a multi-dimensional tensor, etc.). The data processing system can process the specified range of values of the tensor (e.g., over one or more dimensions) or a single indexed value of the tensor in the query, the query by generating a functor that, when executed, causes the identified portion of the tensor to be retrieved or extracted from the corresponding retrieved tensor. Operations can then be performed on the portion(s) of the tensor(s), or the portion(s) of the tensor(s) may be returned for the set of query results. Similar functors can be generated by the data processing system for various conditions (e.g., contains, equals, inequalities, etc.), mathematical operations, transformation operations, ORDER BY, GROUP BY, SAMPLE BY, ANY, ALL, ALL_STRICT, LOGICAL_AND, and LOGICAL_OR operations, among other operations that may be included in the tensor query. Samples or tensors that satisfy the query in an equals condition, for example, by determining whether those samples or tensors have a value that is equal to the value specified in the condition. If the value satisfies the condition, the tensor may be included in the set of query results.

The output of the tensor operation functors executed by the data processing system can include a set of query results. The particular tensors of the samples identified based on the query may be specified using the "SELECT" keyword. If a range of values, or an index of a value in a tensor, in the tensors to be returned is specified in the query, the data processing system can extract the particular ranges or indices along the requested dimensions of the tensors to produce the set of query results. In some implementations, the data processing system can store the retrieved tensors (or data, dimensions, transformed tensors, or other tensors, arrays, or scalars generated or extracted therefrom) in the memory of the data processing system or in a data lake (e.g., the data lake 160) as a query result dataset. The data may be stored, for example, in a format similar to that described in connection with FIG. 2, or in any other suitable format. The data processing system may perform a materialization process on the data corresponding to the set of query results.

In some implementations, the data processing system can generate a set of indices that point to locations of each tensor returned from executing the query as the set of query results. For example, once the query results have been retrieved, a corresponding set of pointer values, references, or indices can be generated that identify the data of each result in the set of query results. The set of indices may be an array if the results are one-dimensional, or may be a multi-dimensional data structure (e.g., a matrix, a tensor, etc.) if the set of query results return more than one type of tensor for each sample. In some implementations, the set of query results can be an array of indices that point to locations of samples in the data lake that satisfy the conditions in the query. In some implementations, the data processing system can format or transform the query result tensors, to conform to a particular shape or dimensionality specified in the query. If the query specifies one or more shuffle operation(s), the set of query results or the set of indices can be randomly ordered or shuffled according to the specified shuffle operation (or a default shuffling algorithm).

At ACT 1120, the data processing system can provide the set of query results as output. To do so, the operations of the data provider 125 described in connection with FIG. 1 can be performed. The set of query results may be provided, for example, by the data processing system to a machine-learning system or process, such as those described in connection with FIGS. 3 and 5. In some implementations, the data processing system can provide the set of query results to the client device (e.g., in a case where the client device provided the query and the data processing system executed the query). In some implementations, the data processing system can provide the set of query results as indices that point to the tensor data returned (or processed) from the query. Using the indices, the tensor data corresponding to the query results can be retrieved from computer memory or from the data lake (e.g., if the data was stored as a separate dataset, for example). The data processing system may provide the set of query results for display to a visualization process, such that the results of the query (e.g., the tensors of each sample 165 returned from the query) can be observed in a graphical user interface. The visualization process may be provided by the data processing system, or may be implemented by the client device.

Figure 12:
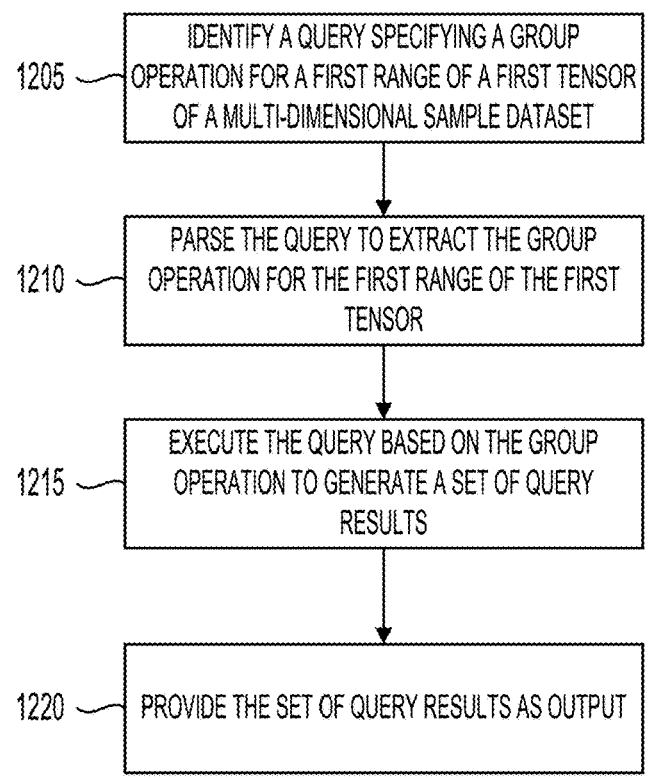
FIG. 12 illustrates a flow diagram of an example method of identifying and executing a tensor query based on a group operation for tensors of a multi-dimensional sample dataset, in accordance with one or more implementations.

FIG. 12 illustrates a flow diagram of an example method of identifying and executing a tensor query based on a group operation for tensors (e.g., the tensors 170) of a multi-dimensional sample dataset (e.g., one or more sets of the samples 165, the data structure 200 of FIG. 2), in accordance with one or more implementations. The method 1200 may be performed, for example, by the data processing system 105, the client device 130, or any other computing system described herein.

Although the method 1200 is described as being performed by the data processing system 105, it should nevertheless be understood that any computing device may perform the various operations of the method 1200, and communicate any results of the operations or intermediate computations relating to the operations to any other computing device described. The method 1200 is described as having steps 1205-1220, however, it should be understood that the steps (referred to as ACTs) may be performed in any order, and that steps may be omitted or additional steps may performed to achieve useful results.

At ACT 1205, the data processing system (e.g., the data processing system 105) can identify a query specifying a group operation for a first range of a first tensor (e.g. a tensor 170 of a set of samples 165) of a multi-dimensional sample dataset (e.g., the set of the samples 165, the data structure 200, etc.). To do so, the data processing system can perform the operations of the query identifier 115 described in connection with FIG. 1. Each tensor (e.g., of the one or more tensors 170 of the multi-dimensional sample dataset) can have a respective identifier (e.g., the tensor name or metadata as described herein) that is common to each sample of the multi-dimensional sample dataset (e.g., as shown in each column of the data structure 200 of FIG. 2). Each tensor may include one or more values or one or more dimensions. The query can specify a first identifier (e.g., a tensor name, other tensor metadata) of a first tensor of the multi-dimensional sample dataset.

The first range or the first dimension of the tensor can be specified in the query as a square bracket notation range notation, as described herein. The range may specify a range of elements among one or more dimensions of the tensor to retrieve as the query results or process as part of determine which tensors to return as the set of query results, as described herein. In some implementations, the query can specify a requested shape for the data identified by the set of indices of the set of query results. The data processing system can generate data for the query results, and the results of the query can include a set of identifiers of the transformed tensors having the requested shape, as described herein. As described herein, the queries can specify one or more tensors, dimensions, ranges, tensors, operations (e.g., mathematical operations, shuffle operations, sampling operations, grouping operations, set-based operations, logical operations, transformation operations, etc.), or conditions. The data processing system can identify the query from an API call, via one or more messages received from a client device (e.g., the client device 130), via user input, from a script or file, or another data source or source of queries. After identifying the query, the data processing system can parse the query as described herein.

Group operations can group samples (or tensors from samples) that have certain conditions in common. For example, a group operation can generate groups for samples having tensors that share a particular value. This functionality can be extended to portions of tensors (e.g., ranges or indices) that have certain tensor values. For example, a first subset of samples of the multi-dimensional sample dataset may include a first tensor, where the first range of the first tensor has a first value, while a second subset of samples of the multi-dimensional sample dataset can include the same first tensor, but where the first range of the first tensor has a second value. The group operation can be utilized to efficiently group these tensors (or samples) according to the value of the tensor (or range, if specified). Furthering the above example, if a query for the multi-dimensional sample data with a group operation was executed on the first range of the first tensor, then the first subset of samples would be returned in a first group, while the second subset of samples would be returned as a second group.

At ACT 1210, the data processing system can parse the query to extract the group operation for the first range of the first tensor and a first identifier of the first tensor. To do so, the data processing system can perform the operations of the query parser 117 described in connection with FIG. 1. For example, the data processing system can perform a syntax check on the identified query string, by applying one or more tensor query syntax checking rules to determine whether the provided query is syntactically correct. The data processing system can perform a semantic check on the identified query string, by applying one or more tensor query semantic checking rules and metadata checking rules to determine whether the provided query is semantically correct. If a syntax error or semantic error is detected in the query, the data processing system can generate an error message with an error identifier that identifies the error. The error identifier may be stored in association with the query, and the error message may be provided for display at the client device or via a display device of the data processing system.

If the query is determined to be both syntactically and semantically correct, the data processing system can process the query to extract the query operations indicated in the query, including any group operations. As described herein, tensor-based queries can include a number of different operations, conditions, or clauses. In some implementations, the queries may include nested queries or sub-queries, which may also be evaluated by the data processing system using the aforementioned techniques. The data processing system may determine, for example, the particular multi-dimensional sample dataset for which the query was provided. The data processing system can identify the dataset by extracting the "FROM" keyword, which may precede an identifier of a dataset upon which the query is to be executed. In some implementations, the data processing system can identify the dataset for which the query is provided without using the "FROM" keyword, for example, by receiving an identifier of the dataset with the query string as part of an API call, or from an application executing on the client device or the data processing system. In some implementations, the identified dataset can be a specified version of the dataset (e.g., specified as part of the query, specified separately from the query, etc.).

The data processing system can parse and extract all of the operations, clauses, tensors, samples, keywords, conditions, or other relevant data, such that tensor computational operations can be generated for the query and the query can be executed accordingly. For example, the data processing system can identify ranges and dimensions of requested tensors in the query. The range may be a range of indices of one or more dimensions of a tensor. The range can be utilized to specify a portion of a tensor to return as query results, or to process in order to identify the samples or tensors that should be returned as query results. The range may be specified using Python or NumPy square bracket notation, where the brackets are appended to the name of the tensor (e.g., the identifier of the tensor) on which the range is being applied. The range of the tensor may enable tensor queries to perform operations on, or only evaluate conditions or expressions on, portions of tensors, rather than the entirety of a tensor. Group operations may be executed as the final operation in a query, and may be limited by a limit clause. Extracting the group operation can include extracting one or more ranges and tensor identifiers from the query that are implicated as part of the group operation. The group operation may utilize a range, or may utilize an entire tensor. In some implementations, ranges can identify the entirety of one or more dimensions of a tensor. Similar notation may be utilized to define shapes of tensors that should be returned as part of the query results. The data processing system can extract the range notation for each tensor for which ranges are specified. The data processing system may also extract additional operations, such as ungroup operations or sampling operations, described in further detail in connection with FIGS. 13 and 14.

At ACT 1215, the data processing system can execute the query based on the first identifier and the group operation to generate a set of query results. To do so, the data processing system can perform the operations of the query executor 120 described in connection with FIG. 1. The set of query results may include a set of indices identifying data corresponding to the first range of the first tensor of each sample of a subset of samples of the multi-dimensional sample dataset identified or retrieved based on the query. To execute a query including a group operation (e.g., which may specify a range-based grouping), the data processing system can iterate through each of the query operations extracted from the query, and generate one or more functors corresponding to the query operations.

Functors, or function objects, include processor-executable instructions that, when executed, cause the data processing system to carry out the operations indicated in the query. The functors may be generated based on templates, which can be populated with pointers, references, or other identifiers of the data to be processed, as well as any numerical constants, conditions, or text data specified in the query. In one example, if the query (e.g., any of the operations described herein, etc.) identifies a particular tensor in a multi-dimensional sample dataset, the data processing system can generate a functor that, when executed, causes the tensor identified in the query to be retrieved. In some implementations, if a range of values of the tensor (e.g., over one or more dimensions) or a single indexed value of the tensor is identified in the query, the data processing system can generate a functor that, when executed, causes the identified portion of the tensor to be retrieved. The retrieval process can be repeated for each sample having the identified tensor in the multi-dimensional sample dataset. Because the tensor data can be stored in chunks or columns, the data processing system can implement chunk-based retrieval and caching to improve performance.

The data processing system can generate functors that implement the operations specified in the tensor query. For a shape operation, the data processing system can generate one or more functors that, when executed, cause the identified tensor to be processed according to the shape function (e.g., to return a scalar if an array, or an array of values if a multi-dimensional tensor, etc.). The data processing system can process the specified range of values of the tensor (e.g., over one or more dimensions) or a single indexed value of the tensor in the query, the query by generating a functor that, when executed, causes the identified portion of the tensor to be retrieved or extracted from the corresponding retrieved tensor. Operations can then be performed on the portion(s) of the tensor(s), or the portion(s) of the tensor(s) may be returned for the set of query results. Similar functors can be generated by the data processing system for various conditions (e.g., contains, equals, inequalities, etc.), mathematical operations, transformation operations, ORDER BY, SAMPLE BY, ANY, ALL, ALL_STRICT, LOGICAL_AND, and LOGICAL_OR operations, among other operations that may be included in the tensor query. Samples or tensors that satisfy the query in an equals condition, for example, by determining whether those samples or tensors have a value that is equal to the value specified in the condition. If the value satisfies the condition, the tensor may be included in the set of query results.

The output of the tensor operation functors executed by the data processing system can include a set of query results. The particular tensors of the samples identified based on the query may be specified using the "SELECT" keyword. If a range of values, or an index of a value, in the tensors to be returned is specified in the query, the data processing system can extract the particular ranges or indices along the requested dimensions of the tensors to produce the set of query results. In some implementations, the data processing system can store the retrieved tensors (or data, dimensions, transformed tensors, or other tensors, arrays, or scalars generated or extracted therefrom) in the memory of the data processing system or in a data lake (e.g., the data lake 160) as a query result dataset. The data may be stored, for example, in a format similar to that described in connection with FIG. 2, or in any other suitable format. The data processing system may perform a materialization process on the data corresponding to the set of query results.

In some implementations, the data processing system can generate a set of indices that point to locations of each tensor returned from executing the query as the set of query results. For example, once the query results have been retrieved, a corresponding set of pointer values, references, or indices can be generated that identify the data of each result in the set of query results. The set of indices may be an array if the results are one-dimensional, or may be a multi-dimensional data structure (e.g., a matrix, a tensor, etc.) if the set of query results return more than one type of tensor for each sample. In some implementations, the set of query results can be an array of indices that point to locations of samples in the data lake that satisfy the conditions in the query. In some implementations, the data processing system can format or transform the query result tensors, to conform to a particular shape or dimensionality specified in the query. If the query specifies one or more shuffle operation(s), the set of query results or the set of indices can be randomly ordered or shuffled according to the specified shuffle operation (or a default shuffling algorithm).

When executing a group operation, the data processing system can further generate the set of query results to include the set of query result samples or tensors within groups. Each group may be stored as a respective array of indices, where each array corresponds to one group and each index corresponds to a respective tensor or sample within that group (or data extracted or generated based on tensors or samples within that group). In one example, the data processing system generates query results that include two groups, the set of query results can include a first identifier of a first group of indices identifying the first subset of samples or tensors corresponding to the first group, and a second identifier of a second group of indices identifying a second subset of samples or tensors corresponding to a second group. As described herein, the particular group to which a resulting sample is assigned can be determined based on the value of the tensor (or value of the range or index of the tensor) implicated in the group operation. Samples with the same value of the tensor (or value of the range or index of the tensor) can be assigned to the same group. Shuffling may occur among groups or within groups.

At ACT 1220, the data processing system can provide the set of query results as output. To do so, the operations of the data provider 125 described in connection with FIG. 1 can be performed. The set of query results (including identifiers or data corresponding to groups) may be provided, for example, by the data processing system to a machine-learning system or process, such as those described in connection with FIGS. 3 and 5. In some implementations, the data processing system can provide the set of query results to the client device (e.g., in a case where the client device provided the query and the data processing system executed the query). In some implementations, the data processing system can provide the set of query results as indices that point to the tensor data returned (or processed) from the query. Using the indices, the tensor data corresponding to the query results can be retrieved from computer memory or from the data lake (e.g., if the data was stored as a separate dataset, for example). The data processing system may provide the set of query results for display to a visualization process, such that the results of the query (e.g., the tensors of each sample 165 returned from the query) can be observed in a graphical user interface. The visualization process may be provided by the data processing system, or may be implemented by the client device.

Figure 13:
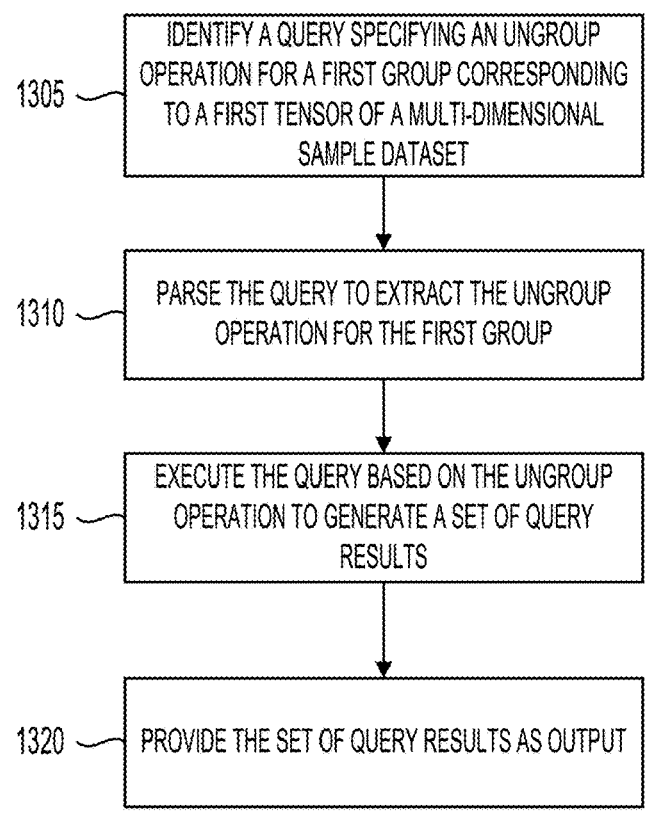
FIG. 13 illustrates a flow diagram of an example method of identifying and executing a tensor query based on an ungroup operation for groups of tensors of a multi-dimensional sample dataset, in accordance with one or more implementations.

FIG. 13 illustrates a flow diagram of an example method 1300 of identifying and executing a tensor query based on an ungroup operation for groups of tensors (e.g., the tensors 170) of a multi-dimensional sample dataset (e.g., one or more sets of the samples 165, the data structure 200 of FIG. 2), in accordance with one or more implementations. The method 1300 may be performed, for example, by the data processing system 105, the client device 130, or any other computing system described herein.

Although the method 1300 is described as being performed by the data processing system 105, it should nevertheless be understood that any computing device may perform the various operations of the method 1300, and communicate any results of the operations or intermediate computations relating to the operations to any other computing device described. The method 1300 is described as having steps 1305-1320, however, it should be understood that the steps (referred to as ACTs) may be performed in any order, and that steps may be omitted or additional steps may performed to achieve useful results.

At ACT 1305, the data processing system (e.g., the data processing system 105) can identify a query specifying an ungroup operation for a first group corresponding to a first tensor (e.g. a tensor 170 of a set of samples 165) of a multi-dimensional sample dataset (e.g., the set of the samples 165, the data structure 200, etc.). To do so, the data processing system can perform the operations of the query identifier 115 described in connection with FIG. 1. Each tensor (e.g., of the one or more tensors 170 of the multi-dimensional sample dataset) can have a respective identifier (e.g., the tensor name or metadata as described herein) that is common to each sample of the multi-dimensional sample dataset (e.g., as shown in each column of the data structure 200 of FIG. 2). Each tensor may include one or more values or one or more dimensions.

The query can specify a first identifier (e.g., a tensor name, other tensor metadata) of a first tensor of the multi-dimensional sample dataset. The query can specify a group of samples that is to be ungrouped. As described here, samples can be grouped into one or more groups according to a value (or range of values) of particular tensor (or a range extracted from the particular tensor) of the samples. An ungroup operation can be utilized to "break up" a grouped dataset into a set of query results that include the respective samples previously included in the particular groups. As described herein, the queries can specify one or more tensors, dimensions, ranges, tensors, operations (e.g., mathematical operations, shuffle operations, sampling operations, grouping operations, set-based operations, logical operations, transformation operations, etc.), or conditions. The data processing system can identify the query from an API call, via one or more messages received from a client device (e.g., the client device 130), via user input, from a script or file, or another data source or source of queries. After identifying the query, the data processing system can parse the query as described herein.

At ACT 1310, the data processing system can parse the query to extract the ungroup operation for the first group. To do so, the data processing system can perform the operations of the query parser 117 described in connection with FIG. 1. For example, the data processing system can perform a syntax check on the identified query string, by applying one or more tensor query syntax checking rules to determine whether the provided query is syntactically correct. The data processing system can perform a semantic check on the identified query string, by applying one or more tensor query semantic checking rules and metadata checking rules to determine whether the provided query is semantically correct. If a syntax error or semantic error is detected in the query, the data processing system can generate an error message with an error identifier that identifies the error. The error identifier may be stored in association with the query, and the error message may be provided for display at the client device or via a display device of the data processing system.

If the query is determined to be both syntactically and semantically correct, the data processing system can process the query to extract the query operations indicated in the query, including any group operations. As described herein, tensor-based queries can include a number of different operations, conditions, or clauses. In some implementations, the queries may include nested queries or sub-queries, which may also be evaluated by the data processing system using the aforementioned techniques. The data processing system may determine, for example, the particular multi-dimensional sample dataset for which the query was provided. The data processing system can identify the dataset by extracting the "FROM" keyword, which may precede an identifier of a dataset upon which the query is to be executed. In some implementations, the data processing system can identify the dataset for which the query is provided without using the "FROM" keyword, for example, by receiving an identifier of the dataset with the query string as part of an API call, or from an application executing on the client device or the data processing system. In some implementations, the identified dataset can be a specified version of the dataset (e.g., specified as part of the query, specified separately from the query, etc.).

The data processing system can parse and extract all of the operations, clauses, tensors, samples, keywords, conditions, or other relevant data, such that tensor computational operations can be generated for the query and the query can be executed accordingly. Ungroup operations may be extracted that identify a particular group. The group can correspond to a first tensor (e.g., the tensor of the samples utilized to generate the group). Extracting the ungroup operation can include extracting one or more group identifiers from the query that are implicated as part of the ungroup operation.

In some implementations, the ungroup operation can identify the tensor (or the tensor range or index) that was utilized to generate the group, rather than an identifier of the group itself. In some implementations, ranges can identify the entirety of one or more dimensions of a tensor. As described herein, square bracket notation or functions (e.g., user-defined functions, etc.) may be utilized to define shapes of tensors that should be returned as part of the query results. The data processing system may also extract additional operations, such as sampling operations, described in further detail in connection with FIG. 14.

At ACT 1315, the data processing system can execute the query based on the ungroup operation to generate a set of query results. The set of query results can include a set of indices identifying each sample of the first group. To do so, the data processing system can perform the operations of the query executor 120 described in connection with FIG. 1. The set of query results may include a set of indices identifying data corresponding to each sample that was previously grouped according to the first tensor of each sample, subject to additional criteria specified in the query. To execute a query including an ungroup operation (e.g., which may specify a tensor or range of a tensor for ungrouping), the data processing system can iterate through each of the query operations extracted from the query, and generate one or more functors corresponding to the query operations, resulting in an ungrouped set of query results as described herein.

Functors, or function objects, include processor-executable instructions that, when executed, cause the data processing system to carry out the operations indicated in the query. The functors may be generated based on templates, which can be populated with pointers, references, or other identifiers of the data to be processed, as well as any numerical constants, conditions, or text data specified in the query. In one example, if the query (e.g., any of the operations described herein, etc.) identifies a particular tensor (or group of tensors or samples) in a multi-dimensional sample dataset, the data processing system can generate a functor that, when executed, causes the tensor (or group of tensors or samples) identified in the query to be retrieved. In some implementations, if a range of values of the tensor (e.g., over one or more dimensions) or a single indexed value of the tensor is identified in the query, the data processing system can generate a functor that, when executed, causes the identified portion of the tensor to be retrieved. The retrieval process can be repeated for each sample having the identified tensor in the multi-dimensional sample dataset. Because the tensor data can be stored in chunks or columns, the data processing system can implement chunk-based retrieval and caching to improve performance.

The data processing system can generate functors that implement the operations specified in the tensor query. For a shape operation, the data processing system can generate one or more functors that, when executed, cause the identified tensor to be processed according to the shape function (e.g., to return a scalar if an array, or an array of values if a multi-dimensional tensor, etc.). The data processing system can process the specified range of values of the tensor (e.g., over one or more dimensions) or a single indexed value of the tensor in the query, the query by generating a functor that, when executed, causes the identified portion of the tensor to be retrieved or extracted from the corresponding retrieved tensor. Operations can then be performed on the portion(s) of the tensor(s), or the portion(s) of the tensor(s) may be returned for the set of query results. Similar functors can be generated by the data processing system for various conditions (e.g., contains, equals, inequalities, etc.), mathematical operations, transformation operations, ORDER BY, GROUP BY, SAMPLE BY, ANY, ALL, ALL_STRICT, LOGICAL_AND, and LOGICAL_OR operations, among other operations that may be included in the tensor query.

The output of the tensor operation functors executed by the data processing system can include a set of query results, including the ungrouped samples or tensors. The particular tensors of the samples identified based on the query, following the ungroup process, may be specified using the "SELECT" keyword. If a range of values or an index of a value in the tensors to be returned is specified in the query, the data processing system can extract the particular ranges or indices along the requested dimensions of the tensors to produce the set of query results. In some implementations, the data processing system can store the retrieved tensors (or data, dimensions, transformed tensors, or other tensors, arrays, or scalars generated or extracted therefrom) in the memory of the data processing system or in a data lake (e.g., the data lake 160) as a query result dataset. The data may be stored, for example, in a format similar to that described in connection with FIG. 2, or in any other suitable format. The data processing system may perform a materialization process on the data corresponding to the set of query results.

The data processing system can generate a set of indices that point to locations of each tensor returned from executing the query as the set of query results. When an ungroup operation is performed, samples or tensors that were previously returned as part of the query results in one or more groups can instead be returned directly as part of the set of query results, subject to any additional criteria in the query. For example, once the query results have been retrieved, a corresponding set of pointer values, references, or indices can be generated that identify the data of each result in the set of query results. The set of indices may be an array if the results are one-dimensional, or may be a multi-dimensional data structure (e.g., a matrix, a tensor, etc.) if the set of query results return more than one type of tensor for each sample. In some implementations, the set of query results can be an array of indices that point to locations of samples in the data lake that satisfy the conditions in the query. In some implementations, the data processing system can format or transform the query result tensors, to conform to a particular shape or dimensionality specified in the query. If the query specifies one or more shuffle operation(s), the set of query results or the set of indices can be randomly ordered or shuffled according to the specified shuffle operation (or a default shuffling algorithm).

At ACT 1320, the data processing system can provide the set of query results as output. To do so, the operations of the data provider 125 described in connection with FIG. 1 can be performed. The set of query results may be provided, for example, by the data processing system to a machine-learning system or process, such as those described in connection with FIGS. 3 and 5. In some implementations, the data processing system can provide the set of query results to the client device (e.g., in a case where the client device provided the query and the data processing system executed the query). In some implementations, the data processing system can provide the set of query results as indices that point to the tensor data returned (or processed) from the query. Using the indices, the tensor data corresponding to the query results can be retrieved from computer memory or from the data lake (e.g., if the data was stored as a separate dataset, for example). The data processing system may provide the set of query results for display to a visualization process, such that the results of the query (e.g., the tensors of each sample 165 returned from the query) can be observed in a graphical user interface. The visualization process may be provided by the data processing system, or may be implemented by the client device.

Figure 14:
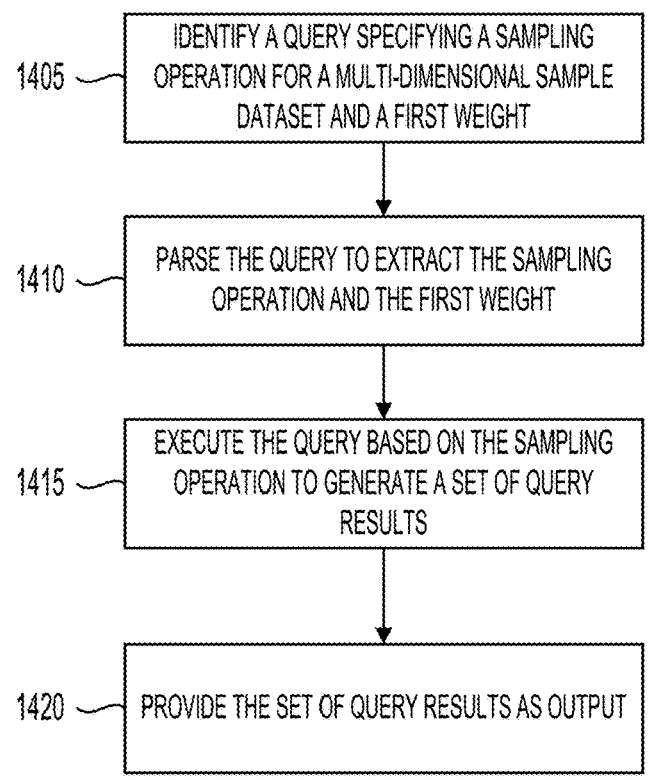
FIG. 14 illustrates a flow diagram of an example method of identifying and executing a tensor query based on a sampling operation for tensors of a multi-dimensional sample dataset, in accordance with one or more implementations.

FIG. 14 illustrates a flow diagram of an example method of identifying and executing a tensor query based on a sampling operation for tensors (e.g., one or more tensors 170) of a multi-dimensional sample dataset (e.g., one or more sets of the samples 165, the data structure 200 of FIG. 2), in accordance with one or more implementations. The method 1400 may be performed, for example, by the data processing system 105, the client device 130, or any other computing system described herein.

Although the method 1400 is described as being performed by the data processing system 105, it should nevertheless be understood that any computing device may perform the various operations of the method 1400, and communicate any results of the operations or intermediate computations relating to the operations to any other computing device described. The method 1400 is described as having steps 1405-1420, however, it should be understood that the steps (referred to as ACTs) may be performed in any order, and that steps may be omitted or additional steps may performed to achieve useful results.

At ACT 1405, the data processing system (e.g., the data processing system 105) can identify a query specifying a sampling operation for tensors (e.g. one or more tensors 170 of a set of samples 165) of a multi-dimensional sample dataset (e.g., the set of the samples 165, the data structure 200, etc.). To do so, the data processing system can perform the operations of the query identifier 115 described in connection with FIG. 1. Each tensor (e.g., of the one or more tensors 170 of the multi-dimensional sample dataset) can have a respective identifier (e.g., the tensor name or metadata as described herein) that is common to each sample of the multi-dimensional sample dataset (e.g., as shown in each column of the data structure 200 of FIG. 2). Each tensor may include one or more values or one or more dimensions. The query can specify a first identifier (e.g., a tensor name, other tensor metadata) of a first tensor of the multi-dimensional sample dataset.

As described herein, the queries can specify one or more tensors, dimensions, ranges, tensors, operations (e.g., mathematical operations, shuffle operations, grouping operations, set-based operations, logical operations, transformation operations, etc.), or conditions. The data processing system can identify the query from an API call, via one or more messages received from a client device (e.g., the client device 130), via user input, from a script or file, or another data source or source of queries. After identifying the query, the data processing system can parse the query as described herein.

Sampling operations can specify one or more sampling weights for values of tensors of samples in the multi-dimensional sample dataset. The weights can collectively form a sampling distribution for samples of the multi-dimensional sample dataset for different tensor values. Each weight value can correspond to a specified condition, which if satisfied for the evaluated sample, causes the respective sampling weight to be assigned to the sample. Multiple expressions and weight values may be specified in a query (e.g., any suitable number of expressions and weights), and may implicate one or more tensors (or ranges or indexed values of tensors of the samples in the multi-dimensional sample dataset. When multiple expressions evaluate to True for a given sample, a specified weight choice rule in the query can specify how the weight is assigned to the sample. If a max_weight rule is specified, then the largest weight value corresponding to a satisfied expression is assigned to the sample. If a sum_weight rule is specified, then the sum of all weight values for all satisfied expressions is assigned to the sample. The query can specify whether the samples should be drawn from the multi-dimensional sample dataset with replacement. The number of query results returned from the sampling operation can be specified in the query.

At ACT 1410, the data processing system can parse the query to extract the sampling operation for the multi-dimensional sample dataset. To do so, the data processing system can perform the operations of the query parser 117 described in connection with FIG. 1. For example, the data processing system can perform a syntax check on the identified query string, by applying one or more tensor query syntax checking rules to determine whether the provided query is syntactically correct. The data processing system can perform a semantic check on the identified query string, by applying one or more tensor query semantic checking rules and metadata checking rules to determine whether the provided query is semantically correct. If a syntax error or semantic error is detected in the query, the data processing system can generate an error message with an error identifier that identifies the error. The error identifier may be stored in association with the query, and the error message may be provided for display at the client device or via a display device of the data processing system.

If the query is determined to be both syntactically and semantically correct, the data processing system can process the query to extract the query operations indicated in the query, including any group operations. As described herein, tensor-based queries can include a number of different operations, conditions, or clauses. In some implementations, the queries may include nested queries or sub-queries, which may also be evaluated by the data processing system using the aforementioned techniques. The data processing system may determine, for example, the particular multi-dimensional sample dataset for which the query was provided. The data processing system can identify the dataset by extracting the "FROM" keyword, which may precede an identifier of a dataset upon which the query is to be executed. In some implementations, the data processing system can identify the dataset for which the query is provided without using the "FROM" keyword, for example, by receiving an identifier of the dataset with the query string as part of an API call, or from an application executing on the client device or the data processing system. In some implementations, the identified dataset can be a specified version of the dataset (e.g., specified as part of the query, specified separately from the query, etc.).

The data processing system can parse and extract all of the operations, clauses, tensors, samples, keywords, conditions, or other relevant data, such that tensor computational operations can be generated for the query and the query can be executed accordingly. For example, the data processing system can identify ranges and dimensions of requested tensors in the query. The range may be a range of indices of one or more dimensions of a tensor. The range can be utilized to specify a portion of a tensor to return as query results, or to process in order to identify the samples or tensors that should be returned as query results. The range may be specified using Python or NumPy square bracket notation, where the brackets are appended to the name of the tensor (e.g., the identifier of the tensor) on which the range is being applied. The range of the tensor may enable tensor queries to perform operations on, or only evaluate conditions or expressions on, portions of tensors, rather than the entirety of a tensor. Sample operations may be executed as the final operation in a query, and may be limited by a limit clause. Extracting the sample operation can include extracting one or more weights, expressions, and tensor identifiers (or ranges of tensor dimensions or indexed values of tensors) from the query that are implicated as part of the sampling operation. The sampling operation may utilize a range, or may utilize an entire tensor.

At ACT 1415, the data processing system can execute the query based on the sampling operation to generate a set of query results. To do so, the data processing system can perform the operations of the query executor 120 described in connection with FIG. 1. The set of query results may include a set of indices identifying data corresponding to the first range of the first tensor of each sample of a subset of samples of the multi-dimensional sample dataset identified or retrieved based on the query. To execute a query including a group operation (e.g., which may specify a range-based grouping), the data processing system can iterate through each of the query operations extracted from the query, and generate one or more functors corresponding to the query operations.

Functors, or function objects, include processor-executable instructions that, when executed, cause the data processing system to carry out the operations indicated in the query. The functors may be generated based on templates, which can be populated with pointers, references, or other identifiers of the data to be processed, as well as any numerical constants, conditions, or text data specified in the query. In one example, if the query (e.g., any of the operations described herein, etc.) identifies a particular tensor in a multi-dimensional sample dataset, the data processing system can generate a functor that, when executed, causes the tensor identified in the query to be retrieved. In some implementations, if a range of values of the tensor (e.g., over one or more dimensions) or a single indexed value of the tensor is identified in the query, the data processing system can generate a functor that, when executed, causes the identified portion of the tensor to be retrieved. The retrieval process can be repeated for each sample having the identified tensor in the multi-dimensional sample dataset. Because the tensor data can be stored in chunks or columns, the data processing system can implement chunk-based retrieval and caching to improve performance.

The data processing system can generate functors that implement the operations specified in the tensor query. For a shape operation, the data processing system can generate one or more functors that, when executed, cause the identified tensor to be processed according to the shape function (e.g., to return a scalar if an array, or an array of values if a multi-dimensional tensor, etc.). The data processing system can process the specified range of values of the tensor (e.g., over one or more dimensions) or a single indexed value of the tensor in the query, the query by generating a functor that, when executed, causes the identified portion of the tensor to be retrieved or extracted from the corresponding retrieved tensor. Operations can then be performed on the portion(s) of the tensor(s), or the portion(s) of the tensor(s) may be returned for the set of query results. Similar functors can be generated by the data processing system for various conditions (e.g., contains, equals, inequalities, etc.), mathematical operations, transformation operations, ORDER BY, GROUP BY, ANY, ALL, ALL_STRICT, LOGICAL_AND, and LOGICAL_OR operations, among other operations that may be included in the tensor query. Samples or tensors that satisfy the query in an equals condition, for example, by determining whether those samples or tensors have a value that is equal to the value specified in the condition. If the value satisfies the condition, the tensor may be included in the set of query results.

The output of the tensor operation functors executed by the data processing system can include a set of query results. The particular tensors of the samples identified based on the query may be specified using the "SELECT" keyword. If a range of values, or an index of a value, in the tensors to be returned is specified in the query, the data processing system can extract the particular ranges or indices along the requested dimensions of the tensors to produce the set of query results. In some implementations, the data processing system can store the retrieved tensors (or data, dimensions, transformed tensors, or other tensors, arrays, or scalars generated or extracted therefrom) in the memory of the data processing system or in a data lake (e.g., the data lake 160) as a query result dataset. The data may be stored, for example, in a format similar to that described in connection with FIG. 2, or in any other suitable format. The data processing system may perform a materialization process on the data corresponding to the set of query results.

In some implementations, the data processing system can generate a set of indices that point to locations of each tensor returned from executing the query as the set of query results. For example, once the query results have been retrieved, a corresponding set of pointer values, references, or indices can be generated that identify the data of each result in the set of query results. The set of indices may be an array if the results are one-dimensional, or may be a multi-dimensional data structure (e.g., a matrix, a tensor, etc.) if the set of query results return more than one type of tensor for each sample. In some implementations, the set of query results can be an array of indices that point to locations of samples in the data lake that satisfy the conditions in the query. In some implementations, the data processing system can format or transform the query result tensors, to conform to a particular shape or dimensionality specified in the query. If the query specifies one or more shuffle operation(s), the set of query results or the set of indices can be randomly ordered or shuffled according to the specified shuffle operation (or a default shuffling algorithm).

When executing a group operation, the data processing system can further generate the set of query results by sampling the samples or tensors identified from the criteria of the query, if any, to generate the of query results. To sample the dataset, the data processing system can assign the respective weight values to each sample of the dataset. The weight values assigned to each sample indicate the relative likelihood that the respective sample will be selected using a pseudorandom selection process (e.g., a higher weight value indicates a higher likelihood that the respective sample will be selected for inclusion in the set of query results). Once the weights are assigned to the samples, the data processing system can pseudo-randomly select samples (or tensors thereof) for inclusion in the set of query results according to the distribution defined by the weight values. If a shuffling operation is specified in the query, a shuffling process for the set of query results may be performed prior to following the sampling process.

At ACT 1420, the data processing system can provide the set of query results as output. To do so, the operations of the data provider 125 described in connection with FIG. 1 can be performed. The set of query results may be provided, for example, by the data processing system to a machine-learning system or process, such as those described in connection with FIGS. 3 and 5. In some implementations, the data processing system can provide the set of query results to the client device (e.g., in a case where the client device provided the query and the data processing system executed the query). In some implementations, the data processing system can provide the set of query results as indices that point to the tensor data returned (or processed) from the query. Using the indices, the tensor data corresponding to the query results can be retrieved from computer memory or from the data lake (e.g., if the data was stored as a separate dataset, for example). The data processing system may provide the set of query results for display to a visualization process, such that the results of the query (e.g., the tensors of each sample 165 returned from the query) can be observed in a graphical user interface. The visualization process may be provided by the data processing system, or may be implemented by the client device.

Figure 15:
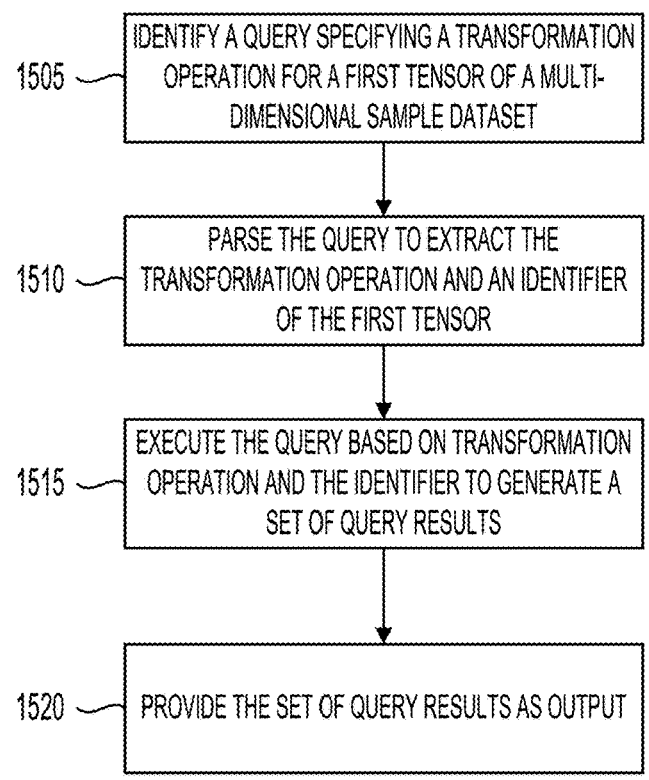
FIG. 15 illustrates a flow diagram of an example method of identifying and executing a tensor query based on a transformation operation for tensors of a multi-dimensional sample dataset, in accordance with one or more implementations.

FIG. 15 illustrates a flow diagram of an example method of identifying and executing a tensor query based on a transformation operation for tensors (e.g., one or more tensors 170) of a multi-dimensional sample dataset (e.g., one or more sets of the samples 165, the data structure 200 of FIG. 2), in accordance with one or more implementations. The method 1500 may be performed, for example, by the data processing system 105, the client device 130, or any other computing system described herein.

Although the method 1500 is described as being performed by the data processing system 105, it should nevertheless be understood that any computing device may perform the various operations of the method 1500, and communicate any results of the operations or intermediate computations relating to the operations to any other computing device described. The method 1500 is described as having steps 1505-1520, however, it should be understood that the steps (referred to as ACTs) may be performed in any order, and that steps may be omitted or additional steps may performed to achieve useful results.

At ACT 1505, the data processing system (e.g., the data processing system 105) can identify a query specifying a transformation operation for tensors (e.g. one or more tensors 170 of a set of samples 165) of a multi-dimensional sample dataset (e.g., the set of the samples 165, the data structure 200, etc.). To do so, the data processing system can perform the operations of the query identifier 115 described in connection with FIG. 1. Each tensor (e.g., of the one or more tensors 170 of the multi-dimensional sample dataset) can have a respective identifier (e.g., the tensor name or metadata as described herein) that is common to each sample of the multi-dimensional sample dataset (e.g., as shown in each column of the data structure 200 of FIG. 2). Each tensor may include one or more values or one or more dimensions. The query can specify a first identifier (e.g., a tensor name, other tensor metadata) of a first tensor of the multi-dimensional sample dataset.

As described herein, the queries can specify one or more tensors, dimensions, ranges, tensors, operations (e.g., mathematical operations, shuffle operations, grouping operations, set-based operations, logical operations, transformation operations, etc.), or conditions. The data processing system can identify the query from an API call, via one or more messages received from a client device (e.g., the client device 130), via user input, from a script or file, or another data source or source of queries. After identifying the query, the data processing system can parse the query as described herein. Tensor queries may specify one or more transformation operations, such as image transformation or video operations (e.g., crop, resize, translation, rotation, etc.), audio transformation operations, normalization operations, mean, median, or mode operations, and addition/sum operations, or multiplication/division operations, among others.

At ACT 1510, the data processing system can parse the query to extract the transformation operation for the multi-dimensional sample dataset. To do so, the data processing system can perform the operations of the query parser 117 described in connection with FIG. 1. For example, the data processing system can perform a syntax check on the identified query string, by applying one or more tensor query syntax checking rules to determine whether the provided query is syntactically correct. The data processing system can perform a semantic check on the identified query string, by applying one or more tensor query semantic checking rules and metadata checking rules to determine whether the provided query is semantically correct. If a syntax error or semantic error is detected in the query, the data processing system can generate an error message with an error identifier that identifies the error. The error identifier may be stored in association with the query, and the error message may be provided for display at the client device or via a display device of the data processing system.

If the query is determined to be both syntactically and semantically correct, the data processing system can process the query to extract the query operations indicated in the query, including any group operations. As described herein, tensor-based queries can include a number of different operations, conditions, or clauses. In some implementations, the queries may include nested queries or sub-queries, which may also be evaluated by the data processing system using the aforementioned techniques. The data processing system may determine, for example, the particular multi-dimensional sample dataset for which the query was provided. The data processing system can identify the dataset by extracting the "FROM" keyword, which may precede an identifier of a dataset upon which the query is to be executed. In some implementations, the data processing system can identify the dataset for which the query is provided without using the "FROM" keyword, for example, by receiving an identifier of the dataset with the query string as part of an API call, or from an application executing on the client device or the data processing system. In some implementations, the identified dataset can be a specified version of the dataset (e.g., specified as part of the query, specified separately from the query, etc.).

The data processing system can parse and extract all of the operations, clauses, tensors, samples, keywords, conditions, or other relevant data, such that tensor computational operations can be generated for the query and the query can be executed accordingly. For example, the data processing system can identify ranges and dimensions of requested tensors in the query. The range may be a range of indices of one or more dimensions of a tensor. The range can be utilized to specify a portion of a tensor to return as query results, or to process in order to identify the samples or tensors that should be returned as query results. The range may be specified using Python or NumPy square bracket notation, where the brackets are appended to the name of the tensor (e.g., the identifier of the tensor) on which the range is being applied. The range of the tensor may enable tensor queries to perform operations on, or only evaluate conditions or expressions on, portions of tensors, rather than the entirety of a tensor.

Transformation operations, such as image transformation or video operations (e.g., crop, resize, translation, rotation, etc.), audio transformation operations, normalization operations, mean, median, or mode operations, and addition/sum operations, or multiplication/division operations, among others, may be extracted from the queries, in addition to identifiers of the tensors (or ranges or values of tensors) or samples upon which the transformation operations are to be performed. The transformation operations may be extracted as one or more keywords, and may include an indication of whether the transformation is to modify the underlying dataset (e.g., as stored in a data lake such as the data lake 160), should generate an additional dataset for storage in the data lake, or should be stored as a temporary result dataset (e.g., for a predetermined period of time, until predetermined operation(s) using the transformed dataset have been performed, etc.). In some implementations, multiple transformation operations may be performed to generate a set of query results, as described herein.

At ACT 1515, the data processing system can execute the query based on the transformation operation to generate a set of query results. To do so, the data processing system can perform the operations of the query executor 120 described in connection with FIG. 1. The set of query results may include a set of indices identifying data corresponding to the first range of the first tensor of each sample of a subset of samples of the multi-dimensional sample dataset identified or retrieved based on the query. To execute a query including a group operation (e.g., which may specify a range-based grouping), the data processing system can iterate through each of the query operations extracted from the query, and generate one or more functors corresponding to the query operations.

Functors, or function objects, include processor-executable instructions that, when executed, cause the data processing system to carry out the operations indicated in the query. The functors may be generated based on templates, which can be populated with pointers, references, or other identifiers of the data to be processed, as well as any numerical constants, conditions, or text data specified in the query. In one example, if the query (e.g., any of the operations described herein, etc.) identifies a particular tensor in a multi-dimensional sample dataset, the data processing system can generate a functor that, when executed, causes the tensor identified in the query to be retrieved. In some implementations, if a range of values of the tensor (e.g., over one or more dimensions) or a single indexed value of the tensor is identified in the query, the data processing system can generate a functor that, when executed, causes the identified portion of the tensor to be retrieved. The retrieval process can be repeated for each sample having the identified tensor in the multi-dimensional sample dataset. Because the tensor data can be stored in chunks or columns, the data processing system can implement chunk-based retrieval and caching to improve performance.

The data processing system can generate functors that implement the operations specified in the tensor query. For a shape operation, the data processing system can generate one or more functors that, when executed, cause the identified tensor to be processed according to the shape function (e.g., to return a scalar if an array, or an array of values if a multi-dimensional tensor, etc.). The data processing system can process the specified range of values of the tensor (e.g., over one or more dimensions) or a single indexed value of the tensor in the query, the query by generating a functor that, when executed, causes the identified portion of the tensor to be retrieved or extracted from the corresponding retrieved tensor. Operations can then be performed on the portion(s) of the tensor(s), or the portion(s) of the tensor(s) may be returned for the set of query results. Similar functors can be generated by the data processing system for various conditions (e.g., contains, equals, inequalities, etc.), mathematical operations, transformation operations, ORDER BY, GROUP BY, ANY, ALL, ALL_STRICT, LOGICAL_AND, and LOGICAL_OR operations, among other operations that may be included in the tensor query. Samples or tensors that satisfy the query in an equals condition, for example, by determining whether those samples or tensors have a value that is equal to the value specified in the condition. If the value satisfies the condition, the tensor may be included in the set of query results.

The output of the tensor operation functors executed by the data processing system can include a set of query results. The particular tensors of the samples identified based on the query may be specified using the "SELECT" keyword. If a range of values, or an index of a value, in the tensors to be returned is specified in the query, the data processing system can extract the particular ranges or indices along the requested dimensions of the tensors to produce the set of query results. In some implementations, the data processing system can store the retrieved tensors (or data, dimensions, transformed tensors, or other tensors, arrays, or scalars generated or extracted therefrom) in the memory of the data processing system or in a data lake (e.g., the data lake 160) as a query result dataset. The data may be stored, for example, in a format similar to that described in connection with FIG. 2, or in any other suitable format. The data processing system may perform a materialization process on the data corresponding to the set of query results.

If transformation operations are specified in the query, such as image transformation or video operations (e.g., crop, resize, translation, rotation, etc.), audio transformation operations, normalization operations, mean, median, or mode operations, and addition/sum operations, or multiplication/division operations, among others, the data processing system can generate corresponding functors to perform the specified transformation operations on the tensor(s) specified in the query. For example, if the query includes a crop function for an image tensor, the data processing system can generate a crop functor corresponding to the dimensions specified in the query. Similar approaches can be utilized for other types of transformation operations specified in the query, such as normalization operations. The functors may be executed by the data processing system using specialized computer hardware, or using machine-learning frameworks or APIs.

The results of the transformation functors can be stored according to the query. In some implementations, the query may include an indication to modify the underlying dataset (e.g., as stored in a data lake such as the data lake 160). In such implementations, the data processing system can update the underlying dataset being queried, and return the set of query results as described herein. In some implementations, the query can include an indication to generate an additional dataset for storage in the data lake. The additional dataset may be stored as an additional version of the underlying dataset, or as an additional dataset in the data lake that may be stored in association with the underlying multi-dimensional sample dataset. In some implementations, the query can include an indication that the transformed tensor data is to be stored as a temporary result dataset (e.g., for a predetermined period of time, until predetermined operation(s) using the transformed dataset have been performed, etc.). In such implementations, the data processing system can store the data corresponding to the output of the transformation operation in a temporary data storage, in association with the condition that the data should be deleted or removed. The set of query results can include the results of the transformation operations, subject to any additional criteria or operations specified in the tensor query. In some implementations, multiple transformation operations may be specified in the query and performed when generating a set of query results, as described herein.

In some implementations, the data processing system can generate a set of indices that point to locations of each tensor returned from executing the query as the set of query results. For example, once the query results have been retrieved, a corresponding set of pointer values, references, or indices can be generated that identify the data of each result in the set of query results. The set of indices may be an array if the results are one-dimensional, or may be a multi-dimensional data structure (e.g., a matrix, a tensor, etc.) if the set of query results return more than one type of tensor for each sample. In some implementations, the set of query results can be an array of indices that point to locations of samples in the data lake (including any samples generated from transformation operations) that satisfy the conditions in the query. In some implementations, the data processing system can format or transform the query result tensors, to conform to a particular shape or dimensionality specified in the query. If the query specifies one or more shuffle operation(s), the set of query results or the set of indices can be randomly ordered or shuffled according to the specified shuffle operation (or a default shuffling algorithm).

At ACT 1520, the data processing system can provide the set of query results as output. To do so, the operations of the data provider 125 described in connection with FIG. 1 can be performed. The set of query results may be provided, for example, by the data processing system to a machine-learning system or process, such as those described in connection with FIGS. 3 and 5. In some implementations, the data processing system can provide the set of query results to the client device (e.g., in a case where the client device provided the query and the data processing system executed the query). In some implementations, the data processing system can provide the set of query results as indices that point to the tensor data returned (or processed) from the query. Using the indices, the tensor data corresponding to the query results can be retrieved from computer memory or from the data lake (e.g., if the data was stored as a separate dataset, for example). The data processing system may provide the set of query results for display to a visualization process, such that the results of the query (e.g., the tensors of each sample 165 returned from the query) can be observed in a graphical user interface. The visualization process may be provided by the data processing system, or may be implemented by the client device.

The systems and methods described herein provide tensor query operations that may be utilized with data lakes or other types of tensor storage systems. The present techniques can be utilized to improve the efficiency and reduce the computational requirements for machine-learning tasks. The data lakes described herein can implement time travel, tensor querying, and rapid data ingestion at scale. Additionally, the data lakes described herein can store unstructured data with all its metadata in deep learning-native columnar format, enabling rapid data streaming and reducing computational overhead and network consumption while training machine-learning models. The techniques described herein can be utilized to materialize data subsets on-the-fly, visualize the datasets in-browser or in-application, and ingest the datasets into deep learning frameworks without sacrificing GPU utilization.

Figure 16:
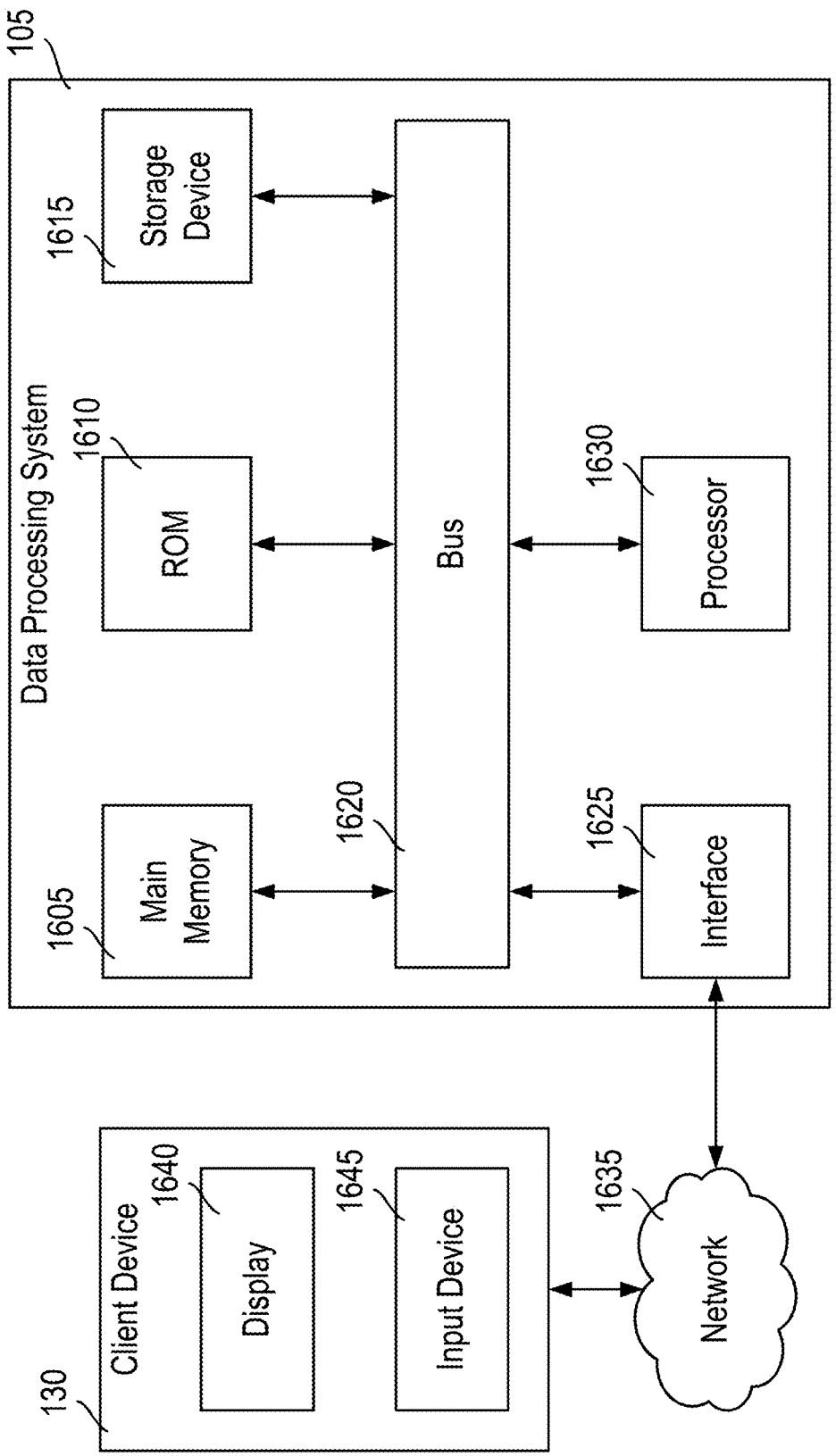
FIG. 16 is a block diagram of an example data processing system and computing environment that may be utilized to perform various techniques or operations described herein, in accordance with one or more implementations.

Referring to FIG. 16, an implementation of the data processing system 105 is shown that can be used, for example, to implement the systems and methods described with reference to FIGS. 1-15. The computing architecture described in FIG. 16 can be used for the data processing system 105 or the client device 130. The data processing system 105 includes a bus 1620 or other communication component for communicating information and a processor 1630 coupled to the bus 1620 for processing information. The data processing system 105 also includes main memory 1605, such as a random access memory (RAM) or other dynamic storage device, coupled to the bus 1620 for storing information, and instructions to be executed by the processor 1630. The main memory 1605 can also be used for storing position information, temporary variables, or other intermediate information during execution of instructions by the processor 1630. The data processing system 105 may further include a read only memory (ROM) 1610 or other static storage device coupled to the bus 1620 for storing static information and instructions for the processor 1630. A storage device 1615, such as a solid-state device, magnetic disk, or optical disk, is coupled to the bus 1620 for persistently storing information and instructions.

The data processing system 105 may be coupled via the bus 1620 to a display 1640, such as a liquid crystal display, or active matrix display, for displaying information to a user. The display 1640 can be a display of the client device 130. An input device 1645, such as a keyboard including alphanumeric and other keys, may be coupled to the bus 1620 for communicating information, and command selections to the processor 1630. The input device 1645 can be a component of the client device 130. The input device 1645 can include a touch screen display 1640. The input device 1645 can include a cursor control, such as a mouse, a trackball, or cursor direction keys, for communicating direction information and command selections to the processor 1630 and for controlling cursor movement on the display 1640.

The data processing system 105 can include an interface 1625, such as a networking adapter. The interface 1625 may be coupled to bus 1620 and may be configured to enable communications with a computing or communications network 1635 and/or other computing systems, e.g., the client device 130. Any type of networking configuration may be achieved using interface 1625, such as wired (e.g., via Ethernet), wireless (e.g., via Wi-Fi, Bluetooth, etc.), preconfigured, ad-hoc, LAN, WAN, etc.

According to various implementations, the processes that effectuate illustrative implementations that are described herein can be achieved by the data processing system 105 in response to the processor 1630 executing an arrangement of instructions contained in main memory 1605. Such instructions can be read into main memory 1605 from another computer-readable medium, such as the storage device 1615. Execution of the arrangement of instructions contained in main memory 1605 causes the data processing system 105 to perform the illustrative processes described herein. One or more processors in a multi-processing arrangement may also be employed to execute the instructions contained in main memory 1605. In alternative implementations, hard-wired circuitry may be used in place of or in combination with software instructions to implement illustrative implementations. Thus, implementations are not limited to any specific combination of hardware circuitry and software.

Although an example processing system has been described in FIG. 16, implementations of the subject matter and the functional operations described in this specification can be carried out using other types of digital electronic circuitry, or in computer software, firmware, or hardware, including the structures disclosed in this specification and their structural equivalents, or in combinations of one or more of them.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims can be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. For example, the data processing system 105 could be a single module, a logic device having one or more processing modules, one or more servers, or part of a search engine.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed only in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation, element, or act herein may also embrace implementations including only a single element. References in the singular or plural form are not intended to limit the presently disclosed systems or methods, their components, acts, or elements to single or plural configurations. References to any act or element being based on any information, act, or element may include implementations where the act or element is based at least in part on any information, act, or element.

Any implementation disclosed herein may be combined with any other implementation, and references to "an implementation," "some implementations," "an alternate implementation," "various implementation," "one implementation," or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description, or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. Although the examples provided may be useful for execution of queries on tensor datasets, the systems and methods described herein may be applied to other environments. The foregoing implementations are illustrative rather than limiting of the described systems and methods. The scope of the systems and methods described herein may thus be indicated by the appended claims, rather than the foregoing description, and changes that come within the meaning and range of equivalency of the claims are embraced therein.

What is claimed is:

1. A method, comprising:
   maintaining, by one or more processors coupled to memory, a plurality of samples of a multi-dimensional sample dataset, each of the plurality of samples comprising a plurality of tensors, the plurality of samples comprising:
      a first sample comprising (i) a first tensor having a first value stored in a first column of the multi-dimensional sample dataset identified by a first column identifier, and (ii) a second tensor having a first plurality of values and stored in a second column of the multi-dimensional sample dataset identified by a second column identifier, and
      a second sample comprising (i) a third tensor having a second value and stored in the first column, and (ii) a fourth tensor having a second plurality of values and stored in the second column;
   identifying, by the one or more processors coupled to memory, a query for the multi-dimensional sample dataset, the query specifying aa group operation identifying the first column identifier, and (ii) a range of values to extract from tensors identified by the second column identifier;
   parsing, by the one or more processors, the query to extract the group operation and the range of values;
   executing, by the one or more processors, the query based on the group operation for the first column identifier to:
      select the first sample for a first group and the second sample for a second group based on the first value being different from the second value,
      extract, based on the range of values, a first subset of the first plurality of values of the second tensor for inclusion in the first group and a second subset of the second plurality of values of the fourth tensor for inclusion in the second group, and
      generate a set of query results comprising a first identifier of the first group and a second identifier of the second group; and
   providing, by the one or more processors, as output, the set of query results.

2. The method of claim 1, further comprising:
   identifying, by the one or more processors, a second query over the multi-dimensional sample dataset, the second query specifying an ungroup operation for the first column identifier;
   parsing, by the one or more processors, the second query to extract the ungroup operation;
   executing, by the one or more processors, the query based on the ungroup operation for the first column identifier to generate a second set of query results, the second set of query results comprising a set of indices identifying each sample included in the first group; and
   providing, by the one or more processors, as output, the second set of query results.

3. The method of claim 1, further comprising:
   identifying, by the one or more processors, a second query over the multi-dimensional sample dataset, the second query specifying a sampling operation for the multi-dimensional sample dataset and identifying a first weight for the first column identifier;
   parsing, by the one or more processors, the second query to extract the sampling operation and the first column identifier;
   executing, by the one or more processors, the second query based on the sampling operation to generate a second set of query results, the second set of query results comprising a first number of indices determined based on the first weight; and
   providing, by the one or more processors, as output, the second set of query results.

4. The method of claim 1, wherein:
   the query further specifies a mathematical operation for the first value of the first tensor, and
   the set of query results further comprises a respective set of references to portions of a result dataset generated based on the mathematical operation.

5. The method of claim 1, wherein executing the query comprises generating, by the one or more processors, one or more functors based on the group operation specified in the query, a condition specified in the query, or a requested shape specified in the query.

6. The method of claim 5, further comprising generating, by the one or more processors, a computational graph based on the one or more functors.

7. The method of claim 1, wherein the query comprises at least one structured query language (SQL) keyword.

8. The method of claim 1, wherein:
   the query specifies a shuffle operation, and
   at least one of the first group or the second group is randomly ordered based on the shuffle operation.

9. The method of claim 1, wherein each of the second tensor and the fourth tensor comprises a plurality of dimensions.

10. The method of claim 1, wherein the plurality of tensors of each sample of the multi-dimensional sample dataset are stored in one or more binary chunks.

11. A system, comprising:
one or more processors coupled to a non-transitory memory, the one or more processors configured to:
maintain a plurality of samples of a multi-dimensional sample dataset, each of the plurality of samples comprising a plurality of tensors, the plurality of samples comprising:
a first sample comprising (i) a first tensor having a first value stored in a first column of the multi-dimensional sample dataset identified by a first column identifier, and (ii) a second tensor having a first plurality of values and stored in a second column of the multi-dimensional sample dataset identified by a second column identifier, and
a second sample comprising (i) a third tensor having a second value and stored in the first column, and (ii) a fourth tensor having a second plurality of values and stored in the second column;
identify a query for the multi-dimensional sample dataset, the query specifying aa group operation identifying the first column identifier, and (ii) a range of values to extract from tensors identified by the second column identifier
parse the query to extract the group operation and the range of values;
execute the query based on the group operation for the first column identifier to:
select the first sample for a first group and the second sample for a second group based on the first value being different from the second value,
extract, based on the range of values, a first subset of the first plurality of values of the second tensor for inclusion in the first group and a second subset of the second plurality of values of the fourth tensor for inclusion in the second group, and
generate a set of query results comprising a first identifier of the first group and a second identifier of the second group; and
provide, as output, the set of query results.

12. The system of claim 11, wherein the one or more processors are further configured to:
identify a second query over the multi-dimensional sample dataset, the second query specifying an ungroup operation for the first column identifier;
parse the second query to extract the ungroup operation;
execute the query based on the ungroup operation for the first column identifier to generate a second set of query results, the second set of query results comprising a set of indices identifying each sample included in the first group; and
provide, as output, the second set of query results.

13. The system of claim 11, wherein the one or more processors are further configured to:
identify a second query over the multi-dimensional sample dataset, the second query specifying a sampling operation for the multi-dimensional sample dataset and identifying a first weight for the first column identifier;
parse the second query to extract the sampling operation and the first column identifier;
execute the second query based on the sampling operation to generate a second set of query results, the second set of query results comprising a first number of indices determined based on the first weight; and
provide, as output, the second set of query results.

14. The system of claim 11, wherein:
the query further specifies a mathematical operation for the first value of the first tensor, and
the set of query results further comprises a respective set of references to portions of a result dataset generated based on the mathematical operation.

15. The system of claim 11, wherein the one or more processors are further configured to execute the query by performing operations comprising generating one or more functors based on the group operation specified in the query, a condition specified in the query, or a requested shape specified in the query.

16. The system of claim 15, wherein the one or more processors are further configured to generate a computational graph based on the one or more functors.

17. The system of claim 11, wherein the query comprises at least one structured query language (SQL) keyword.

18. The system of claim 11, wherein:
the query specifies a shuffle operation, and
at least one of the first group or the second group is randomly ordered based on the shuffle operation.

19. The system of claim 11, wherein each of the second tensor and the fourth tensor comprises a plurality of dimensions.

20. The system of claim 11, wherein the plurality of tensors of each sample of the multi-dimensional sample dataset are stored in one or more binary chunks.

* * * * *